(12) United States Patent
Fuse et al.

(10) Patent No.: US 8,144,179 B2
(45) Date of Patent: Mar. 27, 2012

(54) IMAGE FORMING APPARATUS AND CONTROL METHOD THEREOF

(75) Inventors: Hiroyuki Fuse, Shizuoka-Ken (JP); Hidehito Sasaki, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 948 days.

(21) Appl. No.: 12/128,491

(22) Filed: May 28, 2008

(65) Prior Publication Data

US 2009/0051751 A1    Feb. 26, 2009

Related U.S. Application Data

(60) Provisional application No. 60/957,147, filed on Aug. 21, 2007.

(51) Int. Cl.
- *B41J 2/435* (2006.01)
- *B41J 2/385* (2006.01)
- *H04N 1/60* (2006.01)
- *H04N 1/405* (2006.01)
- *H04N 1/04* (2006.01)
- *G02B 26/12* (2006.01)

(52) U.S. Cl. ........ 347/249; 347/129; 347/132; 347/230; 347/236; 347/237; 347/246; 347/248; 347/255; 358/1.9; 358/3.2; 358/474; 359/218

(58) Field of Classification Search .............. 347/129, 347/132, 144, 230, 236, 237, 239, 246, 248, 347/249, 255; 358/1.9, 3.2, 505, 474; 359/218, 359/216.1
See application file for complete search history.

(56) References Cited

U.S. PATENT DOCUMENTS

| | | | |
|---|---|---|---|
| 6,049,350 A * | 4/2000 | Yamaguchi | 347/241 |
| 6,839,156 B2 * | 1/2005 | Eom et al. | 359/201.1 |
| 7,567,264 B2 * | 7/2009 | Izumiya | 347/116 |
| 2003/0117674 A1 * | 6/2003 | Fuse | 358/505 |
| 2005/0200930 A1 * | 9/2005 | Kanno | 359/212 |
| 2007/0216750 A1 * | 9/2007 | Inagawa et al. | 347/230 |
| 2007/0279723 A1 | 12/2007 | Shiraishi | |

FOREIGN PATENT DOCUMENTS

| | | |
|---|---|---|
| JP | 11-218991 | 10/1999 |
| JP | 2001-33715 | 9/2001 |

* cited by examiner

*Primary Examiner* — Charlie Peng
*Assistant Examiner* — Hung Lam
(74) *Attorney, Agent, or Firm* — Patterson & Sheridan, LLP

(57) ABSTRACT

An image forming apparatus that includes: a laser beam source; plural photoconductive members corresponding to plural colors; a modulation drive unit for performing pulse width modulation for each of colors by an image clock having a cycle of a pixel length,; a single piece of polygon mirror whose reflection surfaces are disposed in a rotation direction thereof with a plurality of different inclination angles with colors; a beam detector that is disposed adjacent to the photoconductive member; and an image clock/data switching unit configured to generate the image clock of a frequency varying with the colors for making the same a color-based image magnification, and switch the image clocks generated for each of the colors in synchronization with a detection signal coming from the beam detector.

8 Claims, 17 Drawing Sheets

IMAGE FORMING APPARATUS AND CONTROL METHOD THEREOF

BACKGROUND OF THE INVENTION

1. Field of the Invention

The present invention relates to an image forming apparatus and a control method thereof and, more specifically, to an image forming apparatus that forms images by electrophotography and a control method thereof.

2. Description of the Related Art

With an image forming apparatus such as copier, printer, and MFP (Multi-Functional Peripheral), previously, the electrophotography has been widely popular. With the electrophotography, a laser beam or others are directed to a photoconductive drum for forming an electrostatic latent image thereon, and the resulting electrostatic latent image is developed using a toner.

For an image forming apparatus of electrophotography, the tandem system has been well known for color printing. Such a tandem image forming apparatus generally includes four photoconductive drums respectively corresponding to four colors of yellow (Y), magenta (M), cyan (C), and black (K). The photoconductive drums each form a toner image of its own color in parallel, and the resulting toner images of four colors are transferred to a paper for overlay one on the other so that a full-color image is formed. These four images are processed almost at once in parallel, and thus printing of a full-color image can be completed at high speed.

With electrophotography, generally, the photoconductive drums are each formed with an electrostatic latent image on its surface by a laser beam scanning the photoconductive drums in the main scanning direction. The laser beam is the one coming from a laser beam source such as laser diode. For scanning in the main scanning direction as such, a rotating multi-faceted reflective member called polygon mirror is often used.

As described above, the tandem image forming apparatus includes four photoconductive drums respectively corresponding to four colors of Y, M, C, and K. Such a previous tandem image forming apparatus is of a general configuration including four laser beam sources and four polygon mirrors respectively corresponding to the four colors. As a result, the size of hardware is large compared with an image forming apparatus specifically for monochrome printing.

In consideration thereof, there is a technology for apparatus downsizing by putting a laser beam source and a polygon mirror in use for sharing, i.e., one laser beam source and one polygon mirror (an example includes US 2007/0279723 A1).

US 2007/0279723 A1 describes the technology for forming four different inclination angles (inclination angles with respect to the rotation axis) to a reflection surface of a polygon mirror disposed in a rotation direction thereof. With such a reflection surface formed with the different inclination angles, a laser beam entering from any one laser beam source is reflected in directions varying with colors in a direction range orthogonal to the main scanning direction (direction of an elevation angle), thereby directing the laser beam toward the four photoconductive drums disposed at each different position. With the technology described in US 2007/0279723 A1, an optical lens (e.g., f-θ lens) is also put in use for sharing for placement between the polygon mirror and each of the photoconductive drums, thereby being able to reduce the hardware size to a considerable degree.

The issue here is that, even if a polygon mirror is put in shared use as described above, the optical path varies before reaching the respective photoconductive drums from the polygon mirror. As a result, the optical paths from the polygon mirror to the respective photoconductive drums are not always the same in length.

The range of a scanning angle for scanning by the rotation of the polygon mirror in the main scanning direction is the same no matter which color. However, if the optical paths from the polygon mirror to the respective photoconductive drums vary in length, images on the photoconductive drums will vary in magnification (image size) in the main scanning direction depending on which color. This thus causes a problem of out of color registration or others when images of four colors are overlaid one on the other.

SUMMARY OF THE INVENTION

The present invention is proposed in consideration of such circumstances, and an object thereof is to provide an image forming apparatus that can, in the course of scanning a plurality of photoconductive drums respectively corresponding to various colors with a laser beam by a single piece of polygon mirror whose reflection surfaces are formed with various different inclination angles respectively corresponding to the colors, reduce any variations of an image magnification possibly occurred in the main scanning direction depending on which color, and eliminate any possible out of color registration or others, and a control method thereof.

In order to achieve the object above, an image forming apparatus in an aspect of the invention includes: a laser beam source; a plurality of photoconductive members respectively corresponding to a plurality of colors; a modulation drive unit configured to subject image data of each of the colors to pulse width modulation by an image clock having a cycle of a pixel length of the image data, and drive the laser beam source; a single piece of polygon mirror whose reflection surfaces are disposed in a rotation direction thereof with a plurality of different inclination angles respectively corresponding to the plurality of colors, and via a plurality of different optical paths respectively corresponding to the inclination angles, the polygon mirror scanning the photoconductive members with a light coming from the laser beam source sequentially for each of the colors in a main scanning direction; a plurality of beam detectors that are disposed respectively adjacent to the photoconductive members on an upstream side of the photoconductive members in the main scanning direction; and an image clock/data switching unit configured to generate the image clock of a frequency varying with the colors for making the same a color-based image magnification defined by an optical path length of each of the optical paths of the colors, and switch at least either the image clocks generated for each of the colors or the image data of each of the colors in synchronization with a detection signal coming from each of the beam detectors.

Moreover, a control method of an image forming apparatus in another aspect of the invention includes: driving a laser beam source by a signal being a result of pulse width modulation based on color-based image data and a color-based image clock; sequentially scanning, by a single piece of polygon mirror whose reflection surfaces are disposed in a rotation direction thereof with a plurality of different inclination angles respectively corresponding to a plurality of colors, for each of the colors, a plurality of photoconductive members provided to each of the colors in a main scanning direction with a light coming from the laser beam source via a plurality of different optical paths respectively corresponding to the inclination angles; detecting a scanning timing in the main scanning direction by a plurality of beam detectors that are disposed respectively adjacent to the photoconductive members on an upstream side of the photoconductive members in the main scanning direction; and generating the image clock of a frequency varying with the colors for making the same a color-based image magnification defined by an optical path length of each of the optical paths of the colors, and switching at least either the image clocks generated for each of the colors or the color-based image data in synchronization with a detection signal coming from each of the beam detectors.

DESCRIPTION OF THE PREFERRED EMBODIMENTS

By referring to the accompanying drawings, described are an image forming apparatus and a control method thereof in embodiments of the invention.

1. Configuration of Image Forming Apparatus (First Embodiment)

Figure 1:
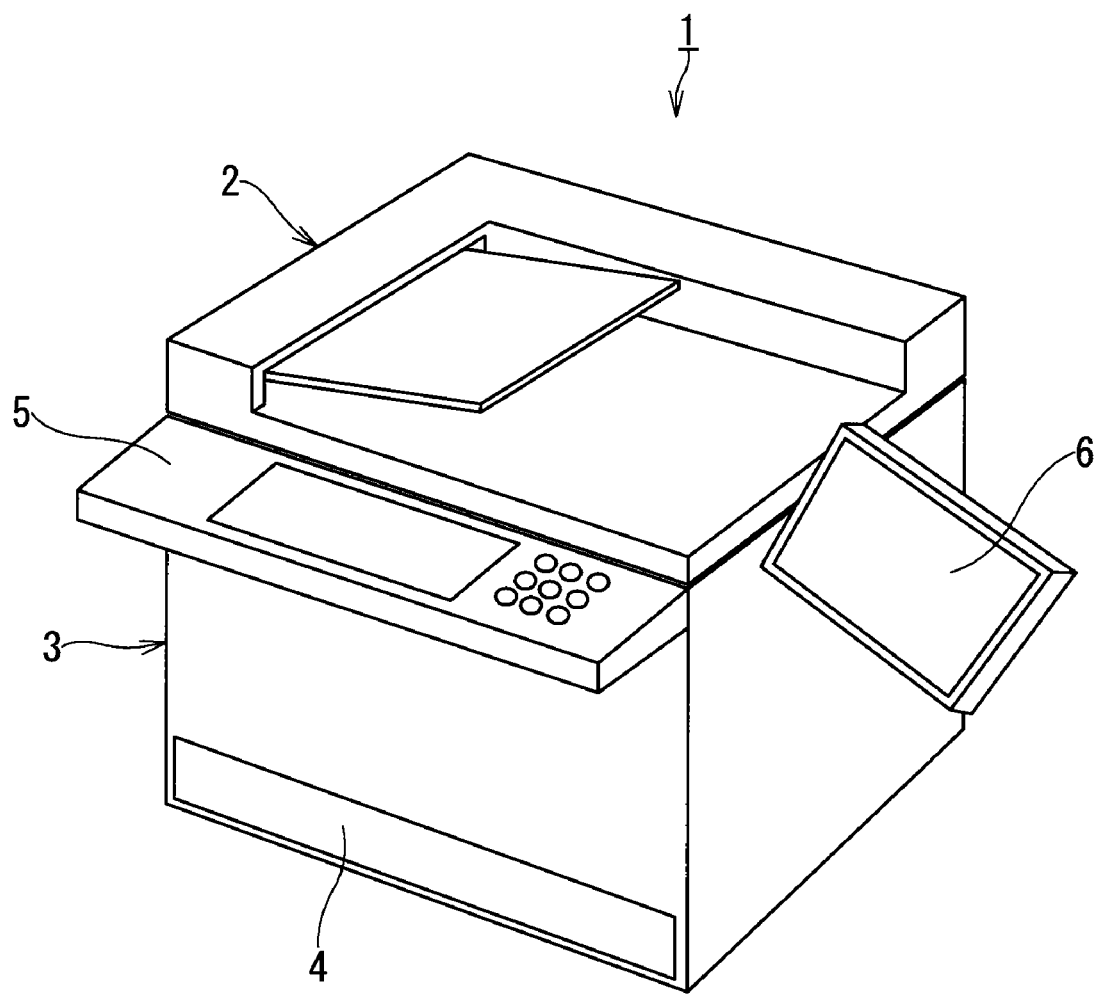
FIG. 1 is a perspective view of an image forming apparatus in a first embodiment of the invention, showing an exemplary outer appearance thereof.

FIG. 1 is a diagram showing the outer appearance of a copier (or MFP) as a typical example of an image forming apparatus 1 of a first embodiment.

The image forming apparatus 1 is configured to include a reading unit 2, an image forming unit 3, a paper feed unit 4, and others.

The reading unit 2 generates image data by optically reading an original document placed on a document glass, or an original document input into an ADF (Auto Document Feeder).

The image forming unit 3 prints, by electrophotography, the image data onto a paper provided by the paper feed unit 4. The image forming unit 3 is provided with a control panel 5 for a user to make various types of operations, and a display panel 6 for displaying various types of information.

Figure 2:
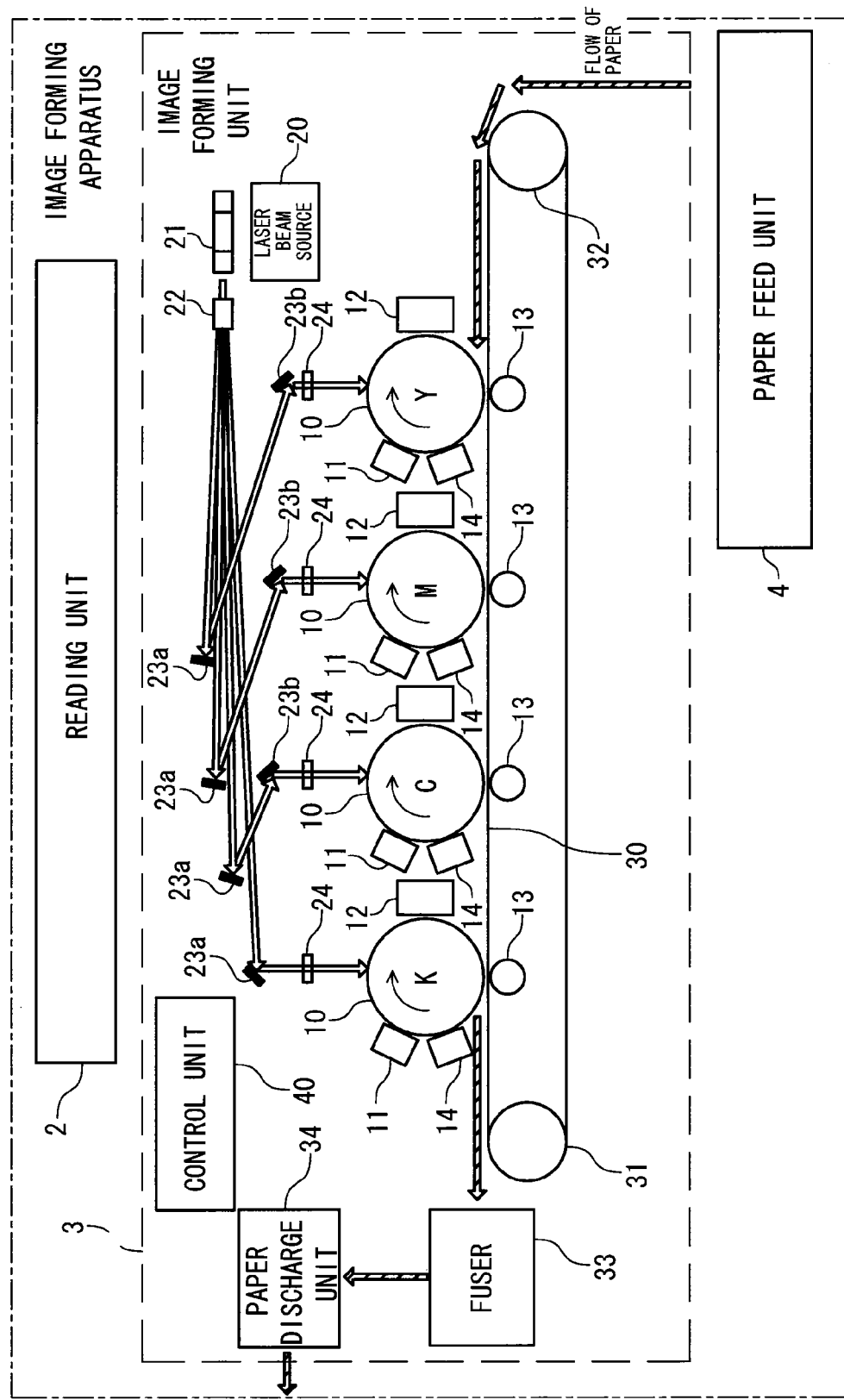
FIG. 2 is a schematic cross sectional diagram showing an exemplary configuration of an image forming unit of the image forming apparatus in the first embodiment.

FIG. 2 is a schematic cross sectional diagram mainly showing an exemplary internal configuration of the image forming unit 3. The image forming apparatus 1 of this embodiment is of a tandem type, and is so configured as to be capable of color printing by electrophotography.

As shown in FIG. 2, four photoconductive drums 10 are disposed in line in the direction along which a paper is transferred. The four photoconductive drums 10 respectively correspond to four colors of yellow (Y), magenta (M), cyan (C), and black (K). Around each of the photoconductive drums 10, other components, i.e., a charging device 11, a developing device 12, a transfer roller 13, a cleaner 14, and others, are disposed in order from upstream to downstream of rotation. The developing devices 12 each carry its own color of toner but share the same configuration, and thus are provided with the same reference numeral.

The charging device 11 electrically charges the surfaces of the photoconductive drums 10 uniformly at a predetermined potential. The surfaces of the photoconductive drums 10 of the colors are then exposed with a laser beam that has been subjected to pulse width modulation in accordance with the level of image data of each of the colors Y, M, C, and K. Any portion exposed with the laser beam as such is reduced in potential so that an electrostatic latent image is formed on the surfaces of the photoconductive drums 10.

The developing device 12 serves to develop the electrostatic latent image formed as such on the photoconductive drums 10 using toners of the respective colors. As a result of such development, the photoconductive drums 10 are respectively formed with toner images of four colors Y, M, C, and K.

On the other hand, the paper feed unit 4 picks up a paper, and directs the paper on a transfer belt 30 from right to left in FIG. 2. In this course of paper transfer, first of all, at a position where the Y-use photoconductive drum 10 is opposing a Y-use transfer roller 13 (at a Y transfer position), a Y-toner image is transferred from the photoconductive drum 10 to the paper.

Next at a position where the M-use photoconductive drum 10 is opposing an M-use transfer roller 13 (at an M transfer position), an M-toner image is transferred from the photoconductive drum 10 to the paper. At this time, the M-toner image is so transferred as to be overlaid on the Y-toner image that is already on the paper.

Similarly, a C-toner image and a K-toner image are transferred by being sequentially overlaid on the paper so that a full-color toner image is formed on the paper. The resulting full-color toner image is fused onto the paper by being heated and pressed by a fuser 33. Thereafter, the paper is discharged to the outside of the image forming apparatus 1 by a paper discharge unit 34.

From the photoconductive drums 10, any toner remained on their surfaces are removed by the cleaners 14 to be ready for the next paper printing. By repeating such a process, printing can be performed in a sequential manner.

With the image forming apparatus 1 in the first embodiment of the invention, as shown in FIG. 2, a single piece of laser beam source 20 and a single piece of polygon mirror 21 serve to divide and direct a laser beam to the photoconductive drums 10 disposed at four different positions.

A laser beam coming from the laser beam source 20 is reflected by the polygon mirror 21 at an elevation angle varying with the colors. Thereafter, the resulting laser beams are each guided to a light exposure position of its corresponding photoconductive drum via an optical path varying with the colors. To be specific, the laser beam reflected by the polygon mirror 21 passes through an f-θ lens 22, and then reaches the light exposure position of each of the photoconductive drums via a primary mirror 23a, a secondary mirror 23b (no secondary mirror 23b for black (K)), and a cylindrical lens 24, which are provided to each of the colors.

Figure 3A:
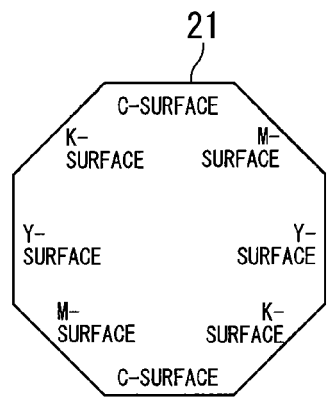
FIGS. 3A to 3C are each a diagram showing the characteristics of a polygon mirror in the first embodiment.
Figure 3C:
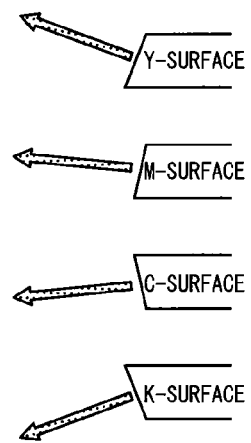
Figure 3B:
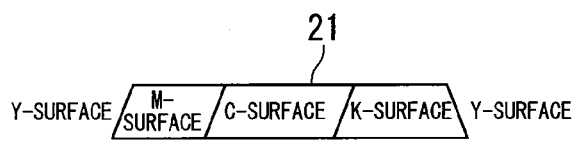

FIGS. 3A to 3C are each a diagram illustrating the characteristics of the polygon mirror 21 for use in the image forming apparatus 1 of this embodiment. FIG. 3A is a plan view of the polygon mirror 21, and FIG. 3B is a side view thereof. FIG. 3C is a diagram showing an exemplary inclination angle of each side of the polygon mirror 21.

Figure 4:
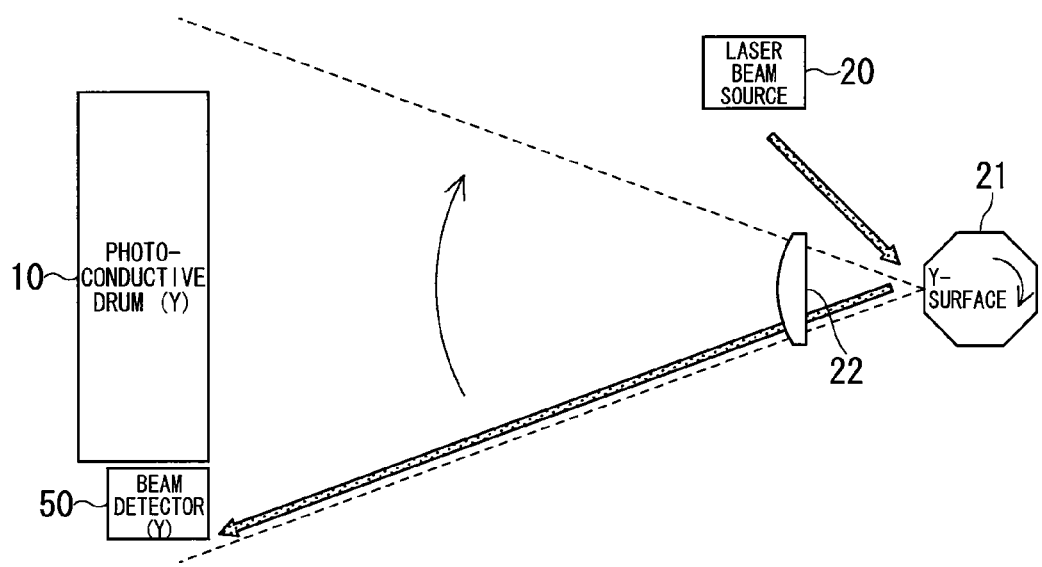
FIG. 4 is a diagram showing scanning by the polygon mirror in a main scanning direction.

FIG. 4 is a diagram showing scanning of the photoconductive drums 10 by the polygon mirror 21 in the main scanning direction with a laser beam. FIG. 4 shows the scanning range in the main scanning direction by developing reflection in the horizontal direction by the primary mirror 23a and the second mirror 23b.

As shown in FIG. 3A, the polygon mirror 21 of this embodiment has a polygon shape being a multiple of the number of colors. In this embodiment, the polygon mirror 21 has an octagon shape being a multiple of four colors.

The surfaces corresponding to the sides of the octagon respectively correspond to the colors of Y, M, C, and K, and as shown in FIG. 3C, the surfaces are inclined at four elevation angles varying with the colors. In FIG. 3C example, the surfaces are so inclined that the elevation angle of Y becomes the largest, and the surfaces are so inclined that the elevation angles of M, C, and K become smaller in this order. The elevation angles of the Y-surface and M-surface each take a positive value, and the elevation angles of the C-surface and K-surface each take a negative value.

A light reflected by one of the surfaces of the polygon mirror 21 is with an elevation angle varying with the colors, and is used for scanning of the corresponding photoconductive drum 10 in the main scanning direction (horizontal direction) by the rotation of the polygon mirror 21. For example, with the Y-surface of the polygon mirror 21, the laser beam is reflected by the polygon mirror 21 with the largest positive elevation angle, and then reaches the light exposure position of the Y-use photoconductive drum 10 after going through the primary mirror 23a, the secondary mirror 23b, and the cylindrical lens 24. By the rotation of the polygon mirror 21, the photoconductive drum 10 is horizontally scanned in the main scanning direction.

When the reflection surface of the polygon mirror 21 is changed from the Y-surface to the M-surface, the laser beam is reflected at the elevation angle smaller than the Y-use elevation angle, and then reaches the M-use photoconductive drum 10 after going through the optical path different from the Y-use optical path. By the rotation of the polygon mirror 21, the laser beam then scans the M-use photoconductive drum 10 in the main scanning direction.

When the reflection surface of the polygon mirror 21 is changed to the C-surface or to the K-surface, similarly, the laser beam is reflected at each different elevation angle, and reaches the C-use or K-use photoconductive drum 10 after going through each different optical path. The C-use and K-use photoconductive drums 10 are then sequentially scanned in the main scanning direction.

By the polygon mirror 21 rotating a half turn, the photoconductive drums 10 of Y, M, C, and K can be scanned by a line in the main scanning direction. When the polygon mirror 21 rotates a turn, the photoconductive drums 10 of Y, M, C, and K are to be scanned by two lines in the main scanning direction.

With previous typical electrophotography in a tandem system, the four photoconductive drums are each subjected to a light exposure process using four laser beam sources and four polygon mirrors respectively corresponding to the colors of Y, M, C, and K.

On the other hand, with the image forming apparatus 1 in the first embodiment of the invention, the four photoconductive drums 10 disposed at different positions are each subjected to a light exposure process by a single piece of laser beam source 20 and a single piece of polygon mirror 21. Accordingly, the hardware related to the light exposure process can be considerably reduced in size, and the cost can be also reduced. Moreover, with such a reduction of the hardware size, the apparatus can be also reduced in size.

On the other hand, because the optical paths from the laser beam source 20 vary with the colors, the length of the optical paths is not always the same among the colors (the length of the optical paths from the laser beam source 20 to the respective photoconductive drums 10 provided for each of the colors). As a result of the length of the optical paths varying with the colors as such, the scanning distance varies with the photoconductive drums in the main scanning direction, thereby resulting in a difference of image magnification in the main scanning direction depending on which color.

Figure 5:
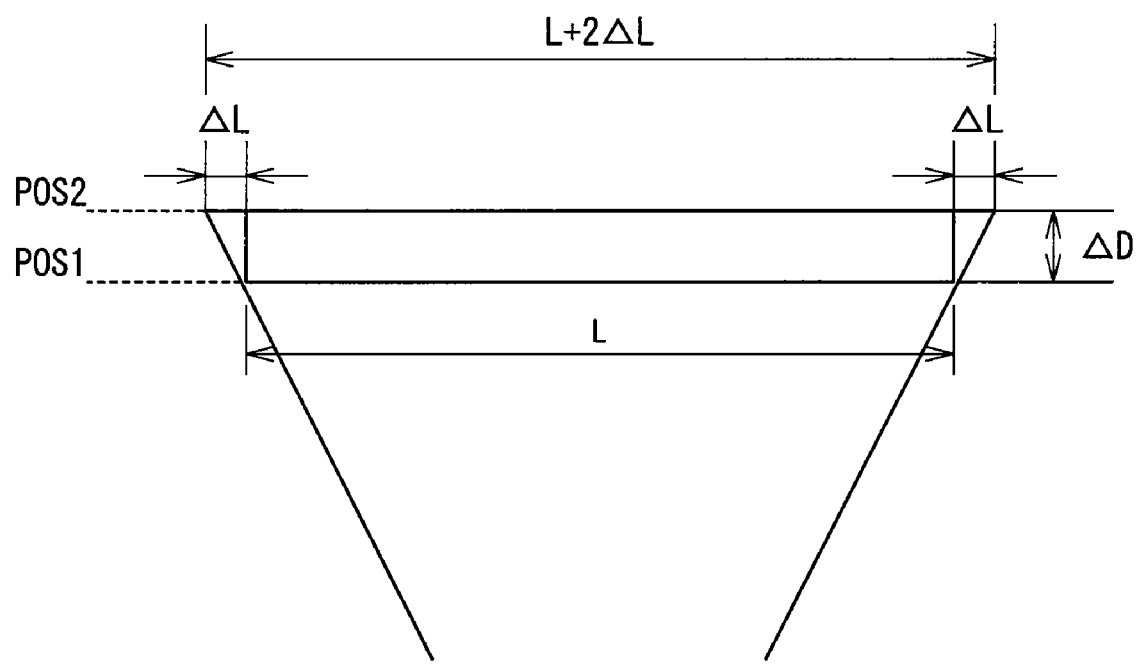
FIG. 5 is a diagram illustrating the relationship between an optical path length and an image magnification, both varying from one color to another.

FIG. 5 is a schematic diagram describing this. Assuming here is that the surface of a photoconductive drum A of a specific color is located at a position of POS1, and the surface of a photoconductive drum B of another color is located at a position of POS2. The distance difference ΔD between POS1 and POS2 is equivalent to the difference of the optical path lengths from the laser beam source. In this case, the range of a scanning angle with respect to the photoconductive drum A in the main scanning direction is the same as the range of the scanning angle with respect to the photoconductive drum B in the main scanning direction. Therefore, the photoconductive drum B located at the position of POS2 will have an image larger in size by 2ΔL as shown in FIG. 5. That is, assuming that an image on the photoconductive drum A is of L in size in the main scanning direction, an image on the photoconductive drum B in the main scanning direction will have the size of L+2ΔL, and even for any one specific image, the photoconductive drum B shows a higher image magnification by (L+2ΔL)/L than the photoconductive drum A. As a result, when two colors are overlaid one on the other, out of color registration is caused, thereby reducing the image quality.

Even with a configuration of including a single piece of laser beam source 20 and a single piece of polygon mirror 21, it is indeed theoretically possible to ensure the uniformity of the optical path lengths varying with the colors by design ideas in terms of the number and the placement of the primary mirrors 23a and the secondary mirrors 23b, and by adjusting the positions thereof with good precision. However, if the number and the placement of the primary mirrors 23a and the secondary mirrors 23b are determined with a priority given to the uniformity of the optical path lengths, this may lead to a result contrary to apparatus downsizing. Furthermore, if the placement positions are to be adjusted with good precision, the time needed for such adjustment takes long, thereby increasing the apparatus cost.

In consideration thereof, the image forming apparatus 1 of this embodiment is adopting a method of preventing occurrence of out of color registration or others by adjusting an image magnification on a color basis at the drive source of the laser beam source 20 while allowing variations of the optical path length with colors. To be specific, an image clock for use to transfer image data is varied in frequency with colors, and the resulting image clocks are adjusted in frequency so that the photoconductive drums 10 are made to have the same image magnification thereon.

The image magnification corresponds to the pixel size on the photoconductive drums 10, and the larger pixel leads to the higher image magnification, and the smaller pixel leads to the lower image magnification. Moreover, the pixel size on the photoconductive drums 10 is dependent on the frequency of an image clock for use to transfer the image data on a pixel basis. The lower frequency of an image clock leads to the larger pixel on the photoconductive drums 10, and the higher frequency of an image clock leads to the smaller pixels on the photoconductive drums 10. By adjusting the frequency of an image clock as such, the photoconductive drums 10 can be adjusted in image magnification.

As described in the foregoing, in this embodiment, a color switching is made whenever with a change of reflection surface of the polygon mirror 21. Because the polygon mirror 21 rotates at a high speed, the colors of Y, M, C, and K are also changed at a high speed. As such, the image clocks of the colors are required to be switched in frequency also at a high speed in synchronization with the switching of the color-based image data.

Figure 6:
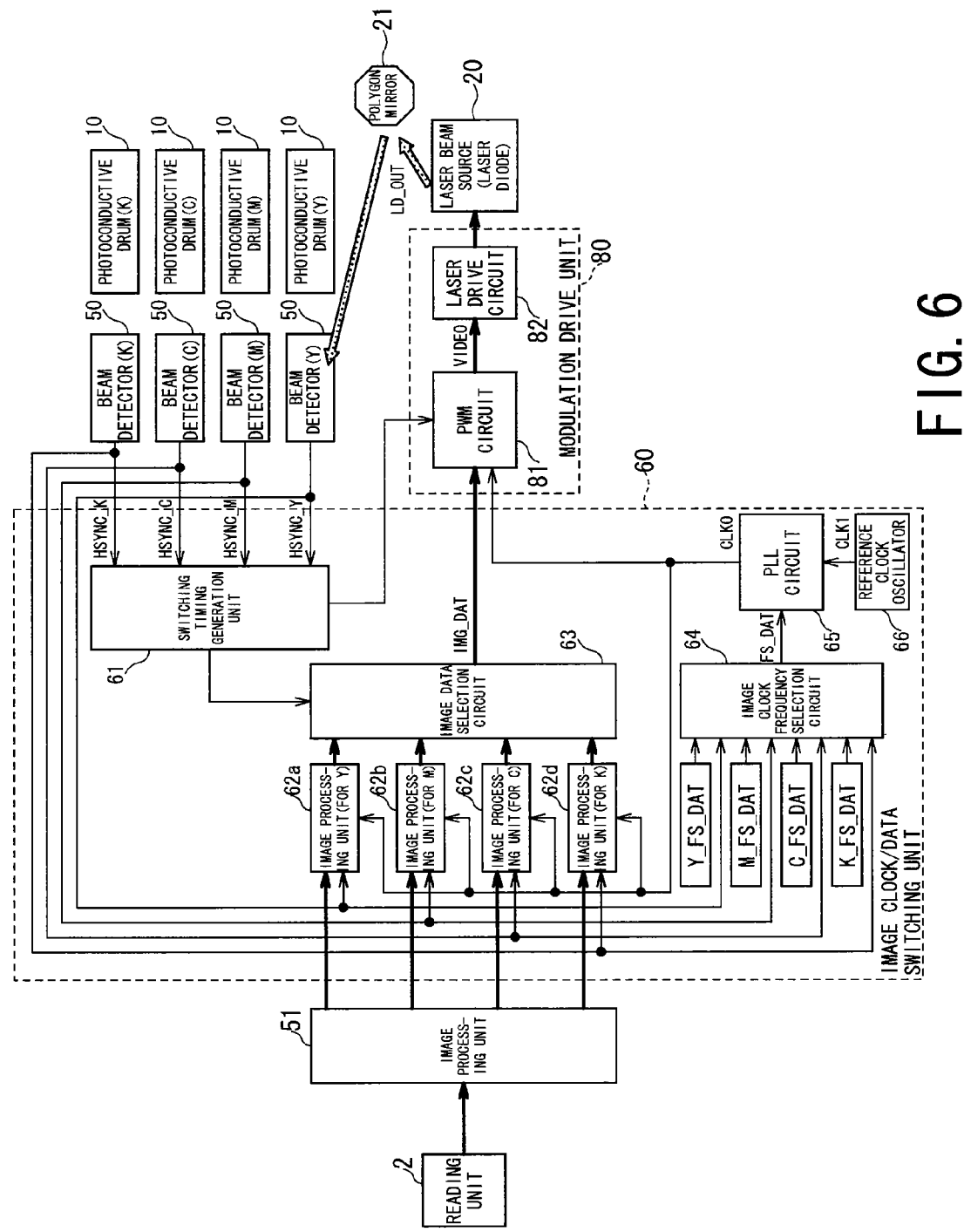
FIG. 6 is a block diagram mainly showing an exemplary detailed configuration of an image clock/data switching unit and that of a modulation drive unit in the first embodiment.

In this embodiment, an image clock/data switching unit 60 takes charge of such a process of switching the image data and the image clocks, and a modulation drive unit 80 takes charge of a process of pulse width modulation and a process of laser beam source driving based on the image data and the image clocks being the switching results (refer to FIG. 6 and others). The image clock/data switching unit 60 and the modulation drive unit 80 are both provided inside of the control unit 40 as internal configuration units. In the below, described are the configuration and operation of the image clock/data switching unit 60 and those of the modulation drive unit 80 of various embodiments.

2. First Embodiment

FIG. 6 is a block diagram showing an exemplary detailed configuration of the image clock/data switching unit 60 and that of the modulation drive unit 80, and an exemplary configuration of peripheral equipment of the first embodiment.

The image clock/data switching unit 60 is configured to include a switching timing generation unit 61, four image processing units ((for use of Y) 62a, (for use of M) 62b, (for use of C) 62c, and (for use of K) 62d), an image data selection circuit 63, an image clock frequency selection circuit 64, a PLL circuit 65, a reference clock oscillator 66, and others. Other than these, a memory (not shown) is also provided for storage of frequency data (Y_FS_DAT, M_FS_DAT, C_FS_DAT, and K_FS_DAT). Herein, the PLL circuit 65 and the reference clock oscillator 66 configure a clock generation unit.

The modulation drive unit 80 is configured to include a PWM circuit 81, a laser drive circuit 82, and others.

Described now is the operation of the units shown in FIG. 6.

The laser beam source 20 includes therein a light-emitting element such as laser diode. A laser beam emitted from the laser beam source 20 is reflected by the polygon mirror 21, and reaches the photoconductive drums 10 of colors respectively associated with the reflection surfaces for scanning of the photoconductive drums 10 in the main scanning direction. Every time when a surface change occurs due to the rotation of the polygon mirror 21, the photoconductive drum 10 to be exposed with the light beam is changed in a sequential manner.

On the upstream side of each of the photoconductive drums 10, the beam detector 50 is adjacently disposed. Before scanning of the photoconductive drums 10 is started for their effective image areas in the main scanning direction, the beam detectors 50 respectively output, sequentially, horizontal synchronizing pulses (HSYNC_Y, HSYNC_M, HSYNC_C, and HSYNC_K) of the colors.

The horizontal synchronizing pulses (HSYNC_Y, HSYNC_M, HSYNC_C, and HSYNC_K) are input, as selection signals, to the four image processing units ((for use of Y) 62a, (for use of M) 62b, (for use of C) 62c, and (for use of K) 62d) and the image clock frequency selection circuit 64, and also input to the switching timing generation unit 61 for generating various types of switching timing signals.

On the other hand, image data read out by the reading unit 2 is input to an image processing unit 51 for various types of image processing not dependent on the image clocks. The output from the image processing unit 51 is input to, as color-based image data (image data_Y, image data_M, image data_C, and image data_K), the image processing units ((for use of Y) 62a, (for use of M) 62b, (for use of C) 62c, and (for use of K) 62d) respectively corresponding to the colors.

On the other hand, with the PLL circuit 65, a reference clock coming from the reference clock oscillator 66 is used as a basis to generate an image clock with a cycle of a unit of a pixel. As described above, with the image forming apparatus 1 of this embodiment, the image clocks are adjusted in frequency on a color basis to reduce any variations of an image magnification in the main scanning direction caused by the color-to-color difference of optical path lengths, and to make the photoconductive drums 10 to have the same image magnification thereon.

Figure 7:
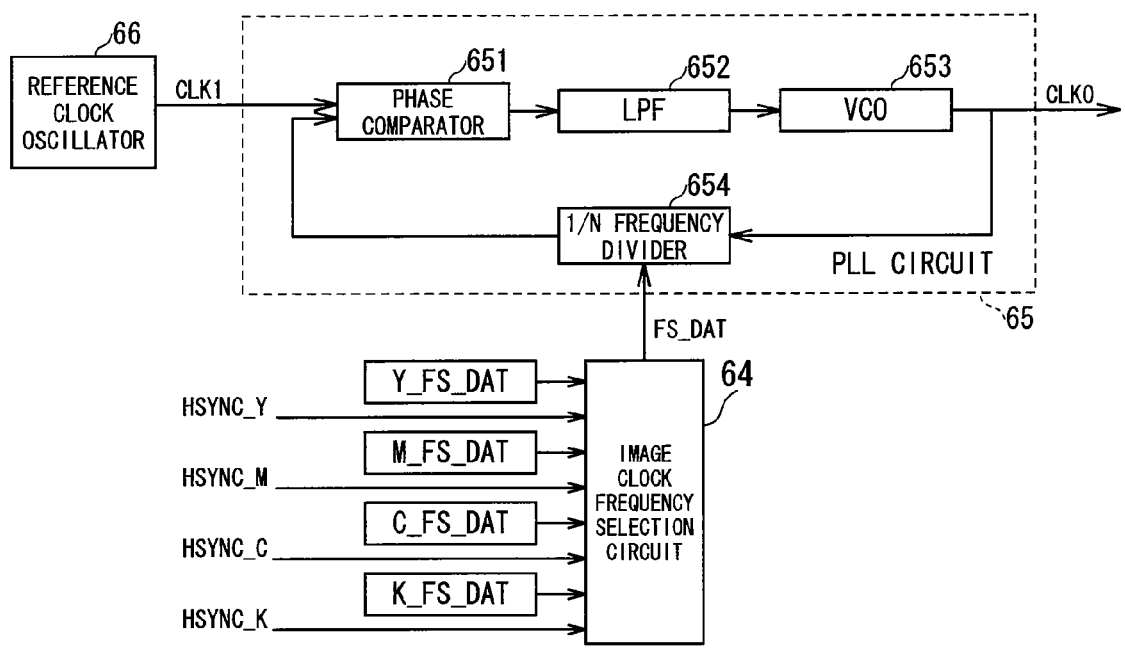
FIG. 7 is a block diagram showing an exemplary configuration of a PLL circuit in the first embodiment.

FIG. 7 is a diagram for illustrating the mechanism of frequency adjustment of image clocks. The PLL circuit 65 generating an image clock is configured to include a phase comparators 651, an LPF (Low-Pass Filter) 652, a VCO (Voltage Controlled Oscillator) 653, and a 1/N frequency divider 654.

The VCO 653 generating an image clock controls the frequency of an image clock using a phase-locked loop in such a manner that the 1/N frequency of the image clock frequency becomes the same as the frequency of a reference clock. Such a PLL circuit 65 generates an image clock (CLKO) of a frequency being a result of multiplying, by N, the frequency of the reference clock.

The higher frequency of an image clock leads to the smaller pixel size. On the other hand, the lower frequency of an image clock leads to the larger pixel size. As such, by adjusting the frequency of an image clock on a color basis, the image magnification can be so adjusted as to be the same among the colors.

As shown in FIGS. 6 and 7, the image clock frequency selection circuit 64 selects the color-based image clock frequency data (Y_FS_DAT, M_FS_DAT, C_FS_DAT, and K_FS_DAT) based on the horizontal synchronizing pulses (HSYNC_Y, HSYNC_M, HSYNC_C, and HSYNC_K) of the colors, and forwards the selection results to the 1/N frequency divider 654 of the PLL circuit 65.

The color-based image clock frequency data (Y_FS_DAT, M_FS_DAT, C_FS_DAT, and K_FS_DAT) is data corresponding to the multiplication number N, which is determined in advance to make the same the image magnification among the colors. The data is stored in any appropriate memory.

As shown in FIG. 6, the image clocks coming from the PLL circuit 65 are output to the image processing units ((for use of Y) 62a, (for use of M) 62b, (for use of C) 62c, and (for use of K) 62d) and the PWM circuit 81.

In the image processing units ((for use of Y) 62a, (for use of M) 62b, (for use of C) 62c, and (for use of K) 62d), image processing is performed with respect to the color-based image data in synchronization with the image clocks, and the results are forwarded to the image data selection circuit 63.

In the image data selection circuit 63, by timing signals (e.g., enable signal for each of the colors such as HDEN_Y, HDEN_M, HDEN_C, and HDEN_K) coming from the switching timing generation circuit 61, the color-based image data is sequentially selected, and the selection results are forwarded to the PWM circuit 81.

The PWM circuit 81 generates a pulse width modulation signal (VIDEO) as a result of pulse width modulation in accordance with the level of a pixel unit of the image data (image data_Y, image data_M, image data_C, and image data_K). The resulting signal is output to the laser drive circuit 82 in synchronization with the image clock.

The pulse width modulation signal is converted into a driving current through with pulse width modulation in the laser drive circuit 82, thereby driving the laser beam source 20 (laser diode).

In a period of reflection by the Y-surface of the polygon mirror 21, first of all, the horizontal synchronizing pulse HSYNC_Y comes from the beam detector 50 for use of yellow, and by this signal, the image data_Y and the frequency data Y_FS_DAT are selected for use of yellow. Thereafter, image processing is performed by the image clock of a frequency based on the frequency data Y_FS_DAT, and a pulse width modulation signal is generated. Then by the laser beam through with pulse width modulation by the pulse width modulation signal, the photoconductive drum 10 for use of yellow is subjected to scanning in the main scanning direction.

Thereafter, when the reflection surface of the polygon mirror 21 is changed from the Y-surface to the M-surface, the horizontal synchronizing pulse HSYNC_M is output first from the beam detector 50 for use of magenta, and by this signal, the image data_M and the frequency data M_FS_DAT for use of magenta are selected. Thereafter, similarly, the photoconductive drum 10 for use of magenta is subjected to scanning in the main scanning direction.

The similar process is applied also to cyan and black, and when the polygon mirror 21 rotates a half turn, the photoconductive drums 10 of the colors are each formed with an electrostatic latent image by a line. By repeating such a process in association with the rotation operation of the photo-conductive drums 10, the photoconductive drums 10 are each formed thereon with an electrostatic image based on the image data of the corresponding color.

Figure 8:
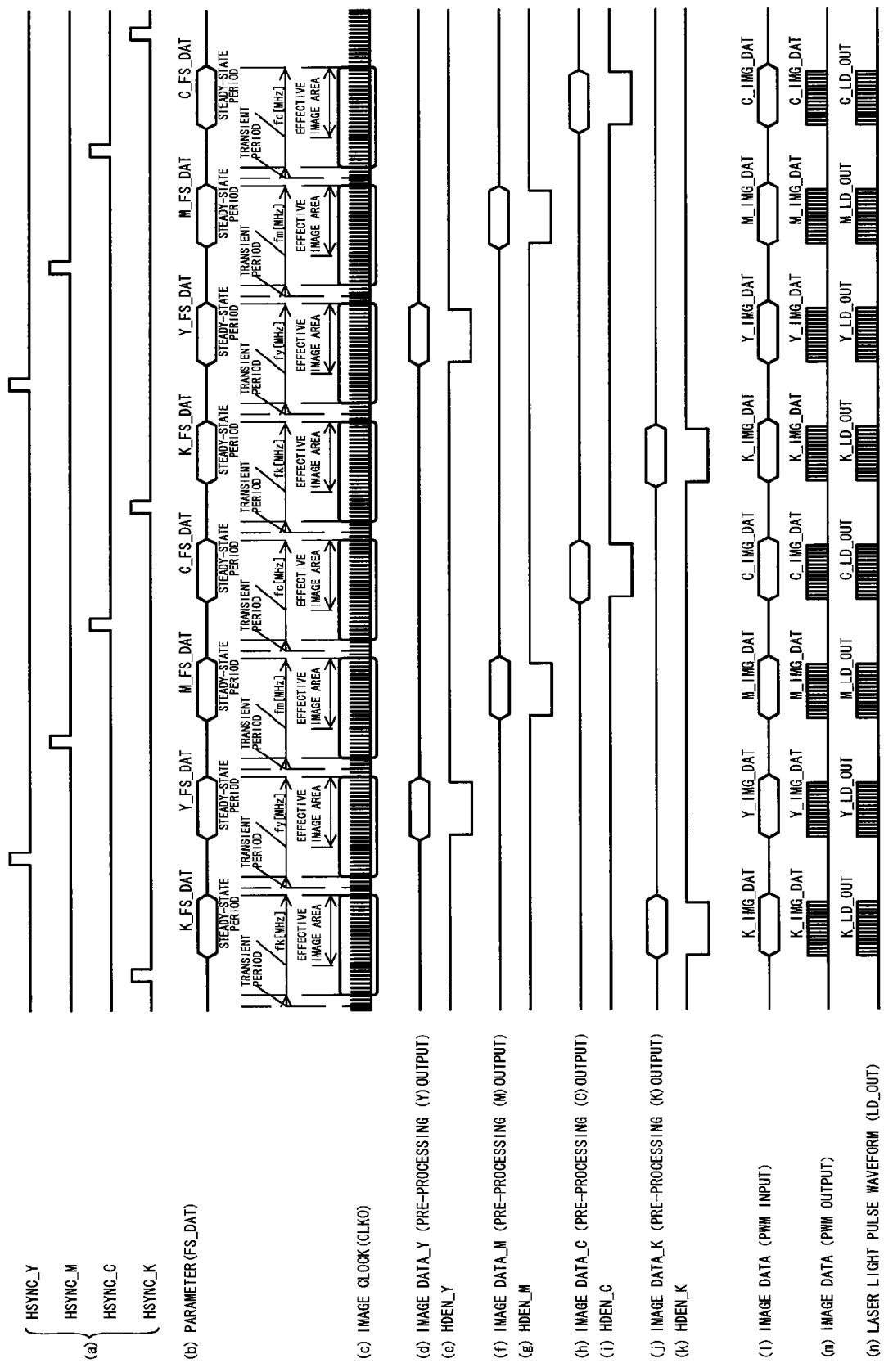
FIG. 8 is a timing diagram mainly showing a processing timing of the image clock/data switching unit and that of the modulation drive unit in the first embodiment.

FIG. 8 is a timing diagram related to a process of the image clock/data switching unit 60 and that of the modulation drive unit 80 in the first embodiment.

The horizontal synchronizing pulses (HSYNC_Y, HSYNC_M, HSYNC_C, and HSYNC_K) of the colors are sequentially output every time a change of the reflection surface occurs due to the rotation of the polygon mirror 21 (FIG. 8(a)).

By these horizontal synchronizing pulses, the image clock frequency data (Y_FS_DAT, M_FS_DAT, C_FS_DAT, and K_FS_DAT) of the colors is sequentially selected (FIG. 8(b)). Based on the selected image clock frequency data, an image clock CLKO of the frequency (fy, fm, fc, or fk) of the color-based image clock is sequentially output from the PLL circuit 65 (FIG. 8(C)).

On the other hand, in the image processing units ((for use of Y) 62a, (for use of M) 62b, (for use of C) 62c, and (for use of K) 62d), image processing is sequentially performed with respect to the color-based image data in synchronization with the image clocks coming from the PLL circuit 65 (FIGS. 8(d), 8(f), 8(h), and 8(j)).

The image data coming from the image processing units ((for use of Y) 62a, (for use of M) 62b, (for use of C) 62c, and (for use of K) 62d) is sequentially extracted by the enable signals (HDEN_Y, HDEN_M, HDEN_C, and HDEN_K) coming from the switching timing generation circuit 61 (FIGS. 8(e), 8(g), 8(i), and 8(k)), and the extraction results are forwarded to the PWM circuit 81.

The PWM circuit 81 generates a pulse width modulation signal in accordance with the image data (Y_IMG_DAT, M_IMG_DAT, C_IMG_DAT, and K_IMG_DAT) of the colors (FIG. 8(m)), and the result serves as a laser beam (LD_OUT) coming from the laser beam source 20 (FIG. 8(n)).

As such, with the image forming apparatus 1 in the first embodiment, the image clock frequency data (Y_FS_DAT, M_FS_DAT, C_FS_DAT, and K_FS_DAT) of the colors switched on the basis of a reflection surface of the polygon mirror 21 is used as a basis to switch the frequency of an image clock, thereby eliminating any possible variations of an image magnification that is often caused by varying optical path lengths with the colors. As such, the resulting color image can be free from out of color registration or others.

3. Second Embodiment

Figure 9:
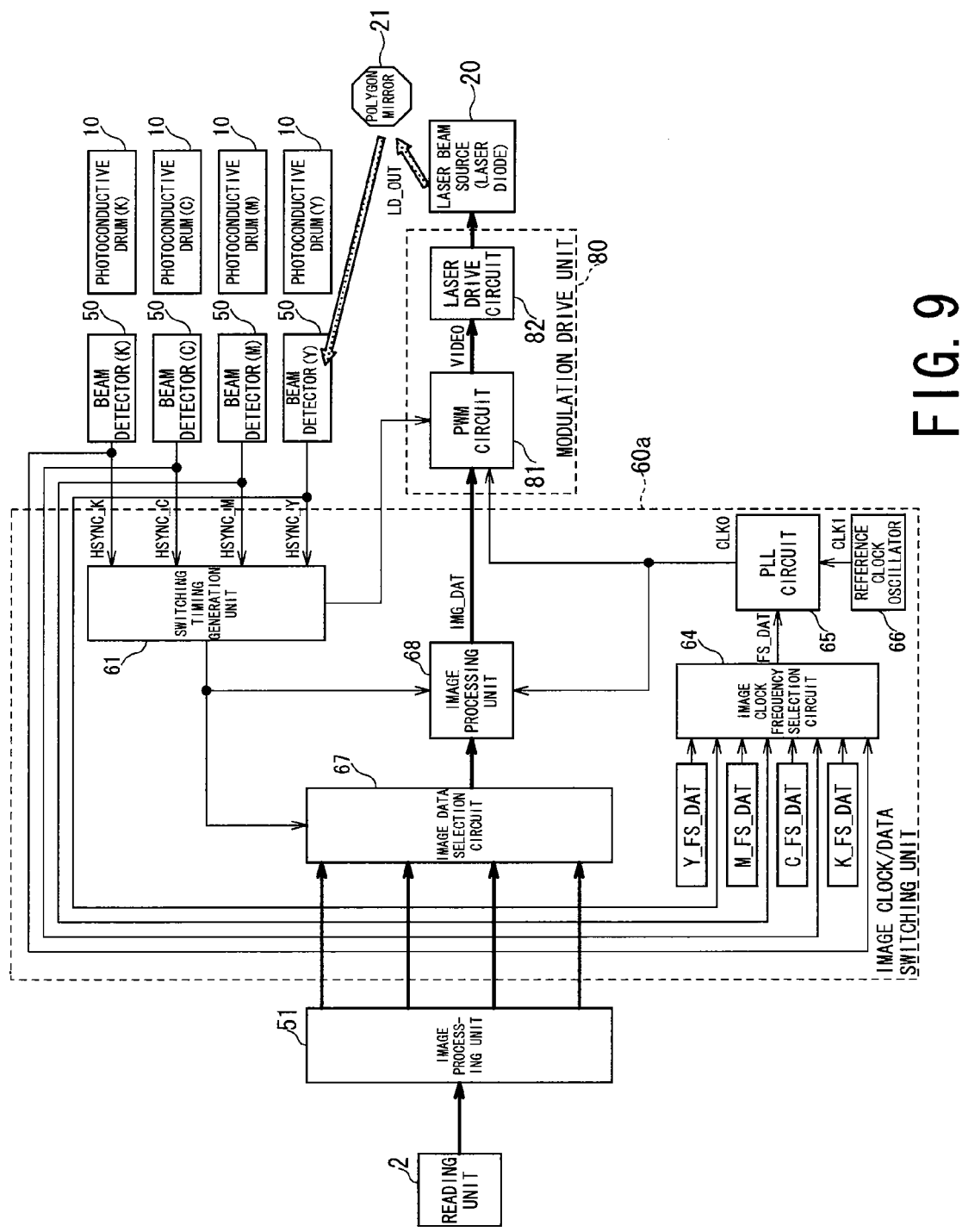
FIG. 9 is a block diagram mainly showing an exemplary detailed configuration of an image clock/data switching unit and that of a modulation drive unit in a second embodiment.

FIG. 9 is a block diagram showing an exemplary detailed configuration of an image clock/data switching unit 60a and that of the modulation drive unit 80, and an exemplary configuration of peripheral equipment in a second embodiment.

Figure 10:
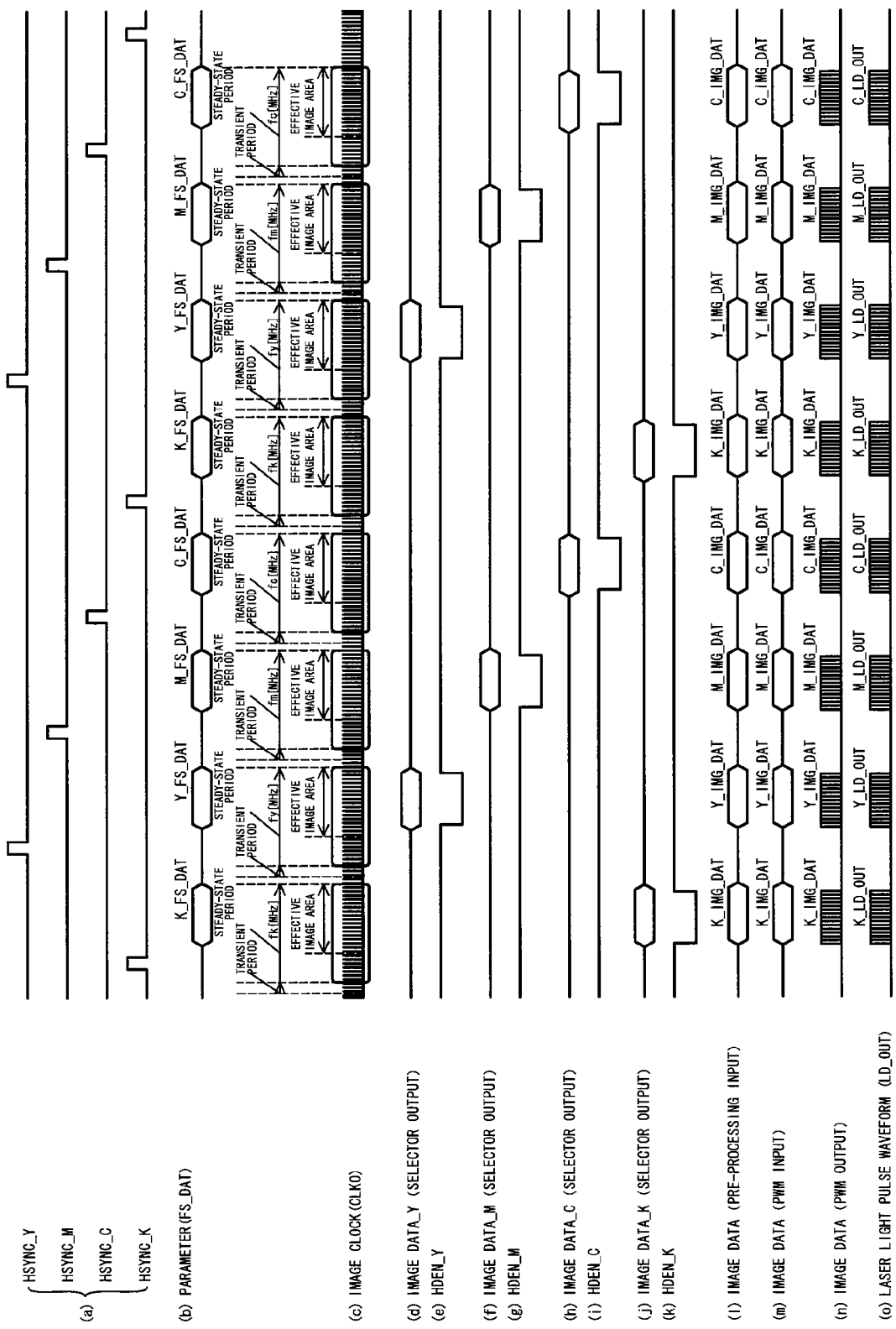
FIG. 10 is a timing diagram mainly showing a processing timing of the image clock/data switching unit and that of the modulation drive unit in the second embodiment.

Moreover, FIG. 10 is a timing diagram related to a process of the image clock/data switching unit 60a and that of the modulation drive unit 80 of the second embodiment.

In the first embodiment, an image processing unit is separately provided on a color basis for image processing in synchronization with an image clock. On the other hand, in the second embodiment, as shown in FIG. 9, in a single piece of image processing unit 68 for shared use no matter which color, image processing is performed in synchronization with an image clock. The color-based image data coming from the image processing unit 51 is forwarded to the image processing unit 68 after being sequentially selected by the image data selection circuit 67. The selection signals are the enable signals (HDEN_Y, HDEN_M, HDEN_C, and HDEN_K) provided from the switching timing generation circuit 61 similarly to the first embodiment. The configuration of the components other than the image data selection circuit 67 and the image processing unit 68 is basically the same as that in the first embodiment.

As shown in FIG. 10, the image data (image data_Y, image data_M, image data_C, and image data_K) coming from the image data selection circuit 67 is sequentially extracted by the enable signals (HDEN_Y, HDEN_M, HDEN_C, and HDEN_K), and the extraction results are forwarded to the PWM circuit 81 after image processing in the image processing unit 68 (FIGS. 10(*d*) to 10(*m*)). Similarly to the first embodiment, in the PWM circuit 81, a pulse width modulation signal is generated in accordance with the color-based image data (Y_IMG_DAT, M_IMG_DAT, C_IMG_DAT, and K_IMG_DAT) (FIG. 10(*n*)), and the result serves as a laser beam (LD_OUT) coming from the laser beam source 20 (FIG. 10(*o*)).

In the second embodiment, the effects similar to those in the first embodiment can be also achieved, and the hardware size can be reduced to a further degree compared with the first embodiment. However, the internal processing itself in the image processing unit 68 requires control application such as switching of image processing parameters on a color basis, thereby complicating the process in the image processing units in the first embodiment.

4. Third Embodiment

In the first and second embodiments, an image clock is generated by the PLL circuit 65 using a phase-locked loop, and the image clock is changed in frequency on a color basis by switching of frequency data every time a color change is observed due to the rotation of the polygon mirror 21.

Generally with an oscillator using a phase-locked loop, when a switching is made to the frequency data, a transient period of some length is required until a clock of stabilized frequency can be derived. If an image clock before completion of a transient period is used for image formation, the pixel size is changed, and thus the resulting image cannot be of good quality.

In consideration thereof, in the first and second embodiments, as shown in FIGS. 8(*c*) and 10(*c*), a transient period is provided after switching of frequency data by a horizontal synchronizing pulse, and image formation is started for an effective image area after the image clock frequency is put in the steady state.

For increasing the speed for image formation to a further degree, this transient period becomes a restriction.

In consideration thereof, in a third embodiment, four image clock oscillators are individually provided each with a fixed frequency corresponding to four colors of Y, M, C, and K, and image clock signals coming respectively from the image clock oscillators are switched based on which color. If this is the configuration, the transient period described above is not required, thereby being able to increase the speed for image formation to a further degree.

Figure 11:
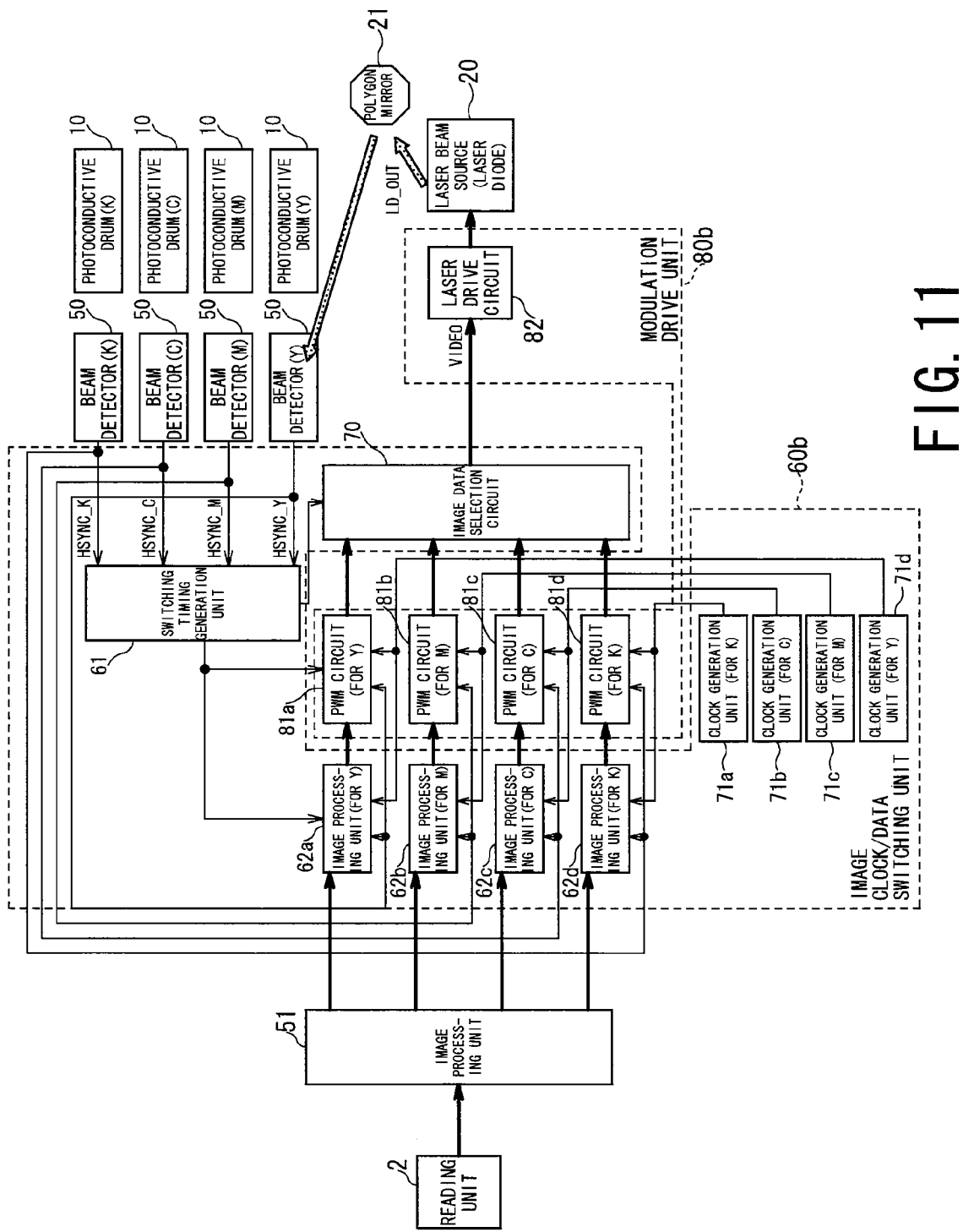
FIG. 11 is a block diagram mainly showing an exemplary detailed configuration of an image clock/data switching unit and that of a modulation drive unit in a third embodiment.

FIG. 11 is a block diagram showing an exemplary detailed configuration of an image clock/data switching unit 60*b* and that of a modulation drive unit 80*b*, and an exemplary configuration of peripheral equipment in the third embodiment.

Figure 12:
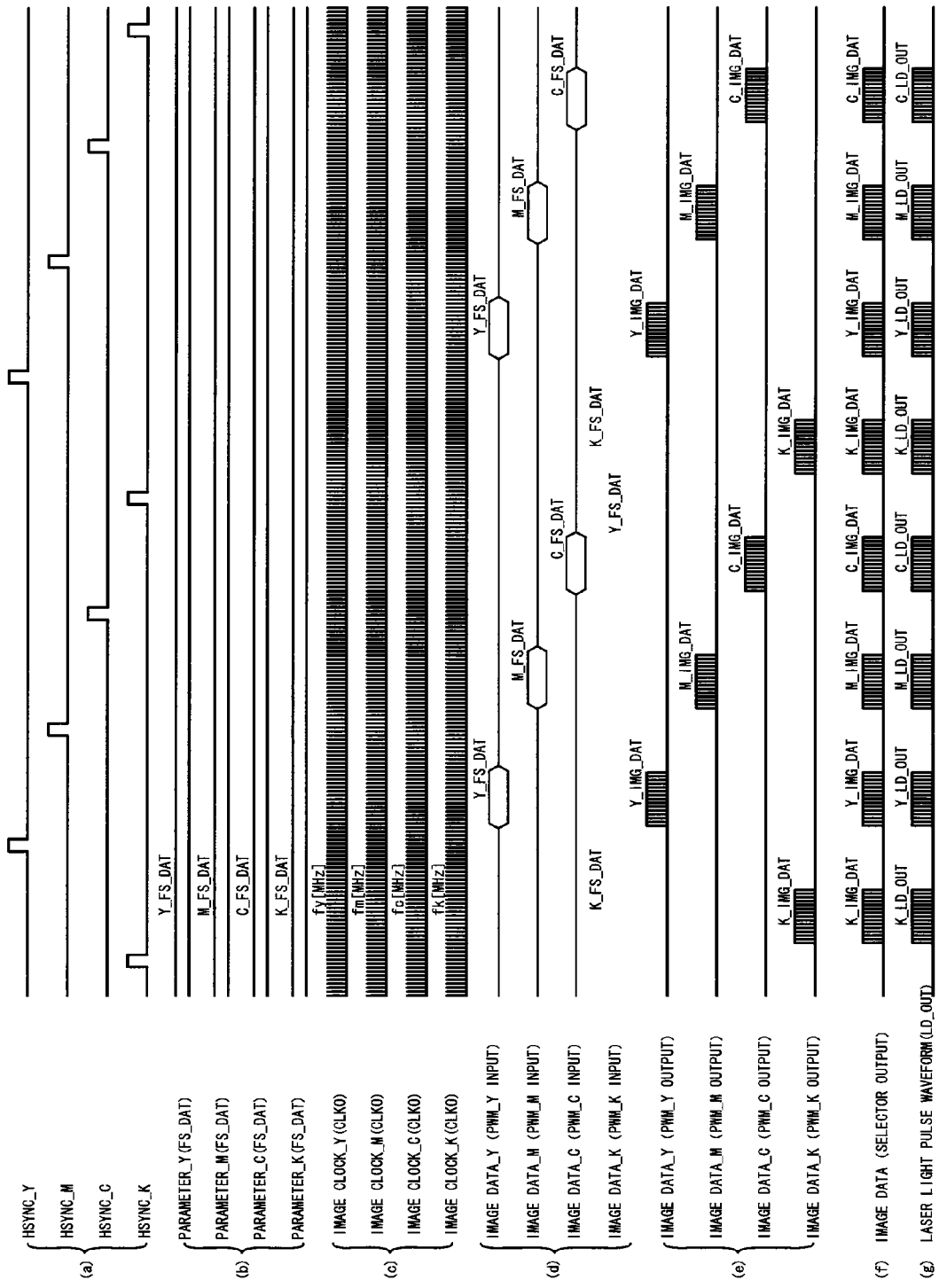
FIG. 12 is a timing diagram mainly showing a processing timing of the image clock/data switching unit and that of the modulation drive unit in the third embodiment.

FIG. 12 is a timing diagram related to a process of the image clock/data switching unit 60*b* and that of the modulation drive unit 80*b* in the third embodiment.

As shown in FIG. 11, in the third embodiment, four clock generation units (71*a*, 71*b*, 71*c*, and 71*d*) respectively corresponding to four colors of Y, M, C, and K are separately provided.

Moreover, four image processing units (62*a*, 62*b*, 62*c*, and 62*d*) respectively corresponding to the four colors of Y, M, C, and K, and four PWM circuits (81*a*, 81*b*, 81*c*, and 81*d*) are also provided separately.

From the clock generation units (71*a*, 71*b*, 71*c*, and 71*d*), image clocks of a fixed frequency (fy, fm, fc, or fk) varying with the colors are each provided (refer to FIG. 12(*c*)). The method of clock generation is not specifically restricted, and may be a method of multiplying a crystal oscillator source, or may be configured as a PLL oscillator. If with an oscillator of PLL type as such, as shown in FIG. 12(*b*), the frequency data may each take always a value fixed on a color basis irrespective of a color change observed in the polygon mirror 21.

The image clocks coming from the clock generation units (71*a*, 71*b*, 71*c*, and 71*d*) are respectively input to the image processing units (62*a*, 62*b*, 62*c*, and 62*d*) of the colors and the PWM circuits (81*a*, 81*b*, 81*c*, and 81*d*) in accordance with which color.

In the image processing units (62*a*, 62*b*, 62*c*, and 62*d*), image processing is performed in synchronization with any input image clock (FIG. 12(*d*)). In the PWM circuits (81*a*, 81*b*, 81*c*, and 81*d*), a signal through with pulse width modulation in accordance with the pixel level of the image data is generated in synchronization with the image clocks (FIG. 12(*e*)).

The output from each of the PWM circuits (81*a*, 81*b*, 81*c*, and 81*d*) are output to the laser drive circuit 82 after being sequentially selected by the image data selection circuit 70 (FIG. 12(*f*)). Thereafter, based on a drive signal coming from the laser drive circuit 82, a laser beam is output from the laser beam source 20 (FIG. 12(*g*))

5. Fourth Embodiment

Figure 13:
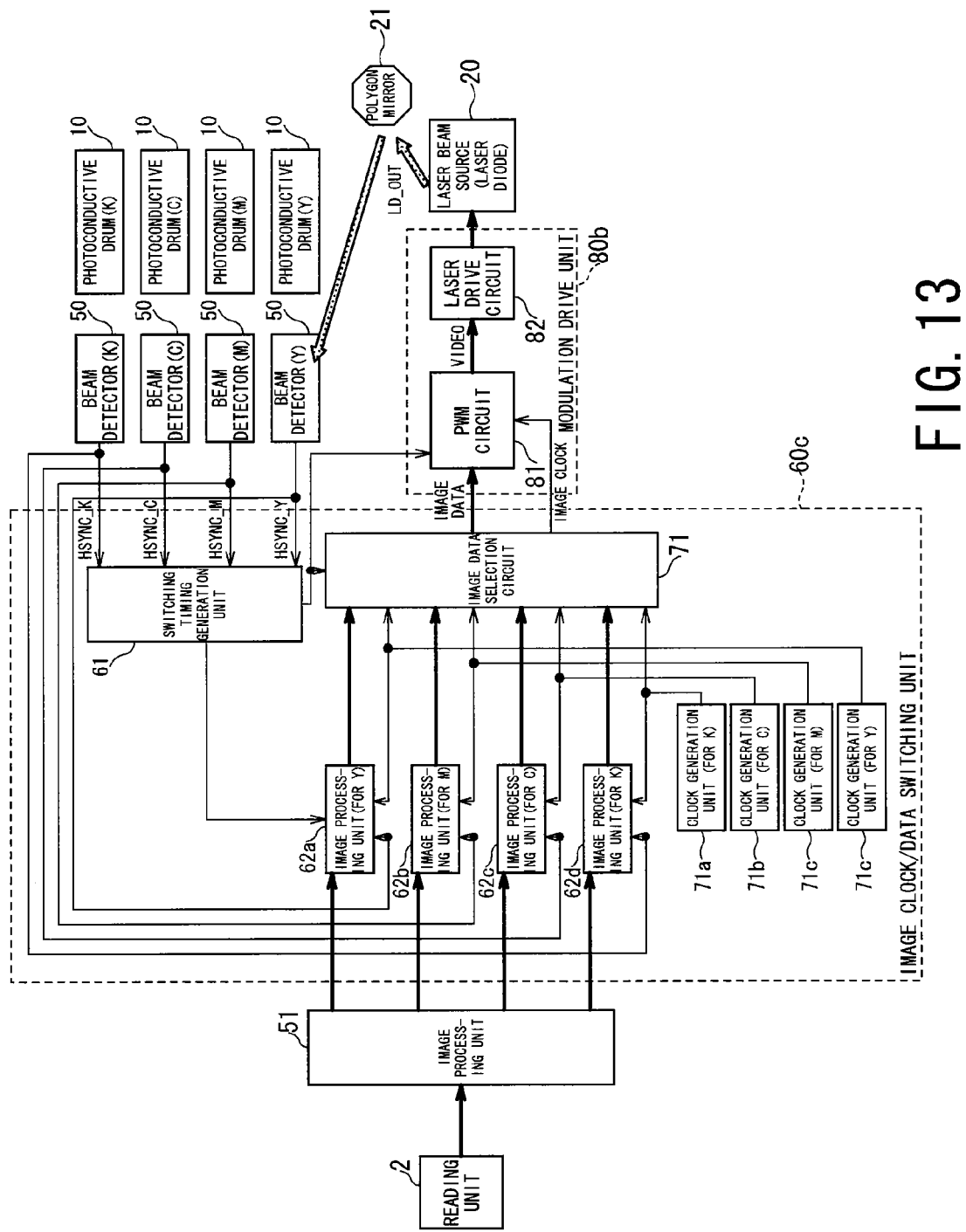
FIG. 13 is a block diagram mainly showing an exemplary detailed configuration of an image clock/data switching unit and that of a modulation drive unit in a fourth embodiment.

FIG. 13 is a block diagram showing an exemplary detailed configuration of an image clock/data switching unit 60*c* and that of the modulation drive unit 80, and an exemplary configuration of peripheral equipment in a fourth embodiment.

Figure 14:
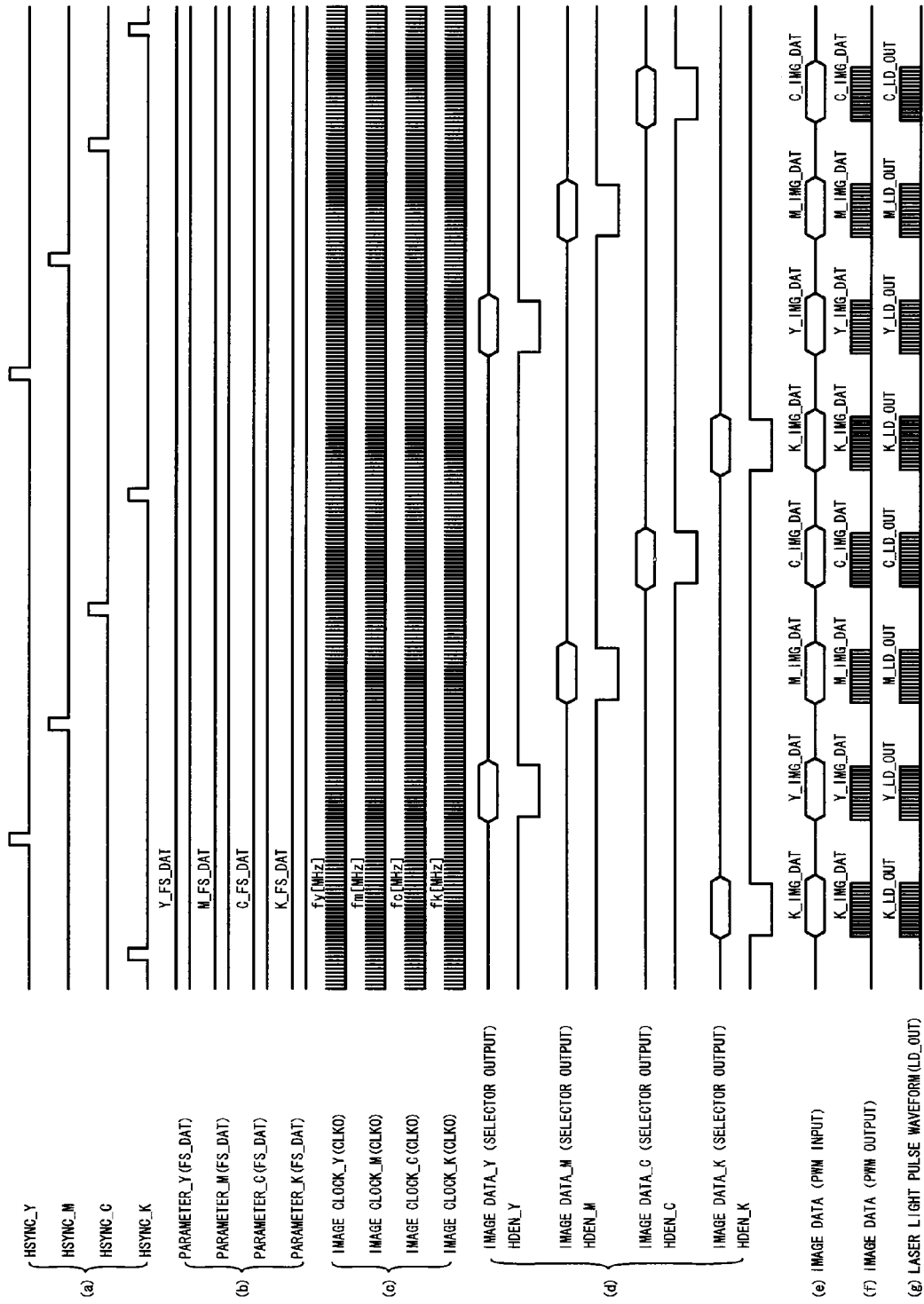
FIG. 14 is a timing diagram mainly showing a processing timing of the image clock/data switching unit and that of the modulation drive unit in the fourth embodiment.

FIG. 14 is a timing diagram related to a process of the image clock/data switching unit 60*c* and that of the modulation drive unit 80 in the fourth embodiment.

In the fourth embodiment, the configuration is of including the PWM circuit 81 solely for shared use among the colors instead of separately providing a PWM circuit for each of the colors.

In the image processing units (62*a*, 62*b*, 62*c*, and 62*d*), image data as a result of image processing in synchronization with an image clock is input to the PWM circuit 81 of shared use after being sequentially selected by the image data selection circuit 71 (FIGS. 14(*d*) and (*e*)).

The image clocks coming from the clock generation units (71*a*, 71*b*, 71*c*, and 71*d*) are also input to the PWM circuit 81 of shared use after being sequentially selected by the image data selection circuit 71.

In the PWM circuit 81, a signal as a result of pulse width modulation in accordance with a pixel level of the image data is generated in synchronization with the image clocks selected by the image data selection circuit 71 for each of the colors (FIG. 14(*f*)). The output from the PWM circuit 81 is forwarded to the laser drive circuit 82, and based on a drive signal coming from the laser drive circuit 82, a laser beam is output from the laser beam source 20 (FIG. 14(*g*)).

In the fourth embodiment, the effects similar to those in the third embodiment can be also achieved, and the hardware size can be reduced to a further degree than the third embodiment because the PWM circuit 81 is solely provided for shared use by the colors. Note here that the image data selection circuit 71 is required to select the image clocks other than the image data, thereby slightly complicating the process of the image data selection circuit 71 compared with the third embodiment.

6. Fifth Embodiment

Figure 15:
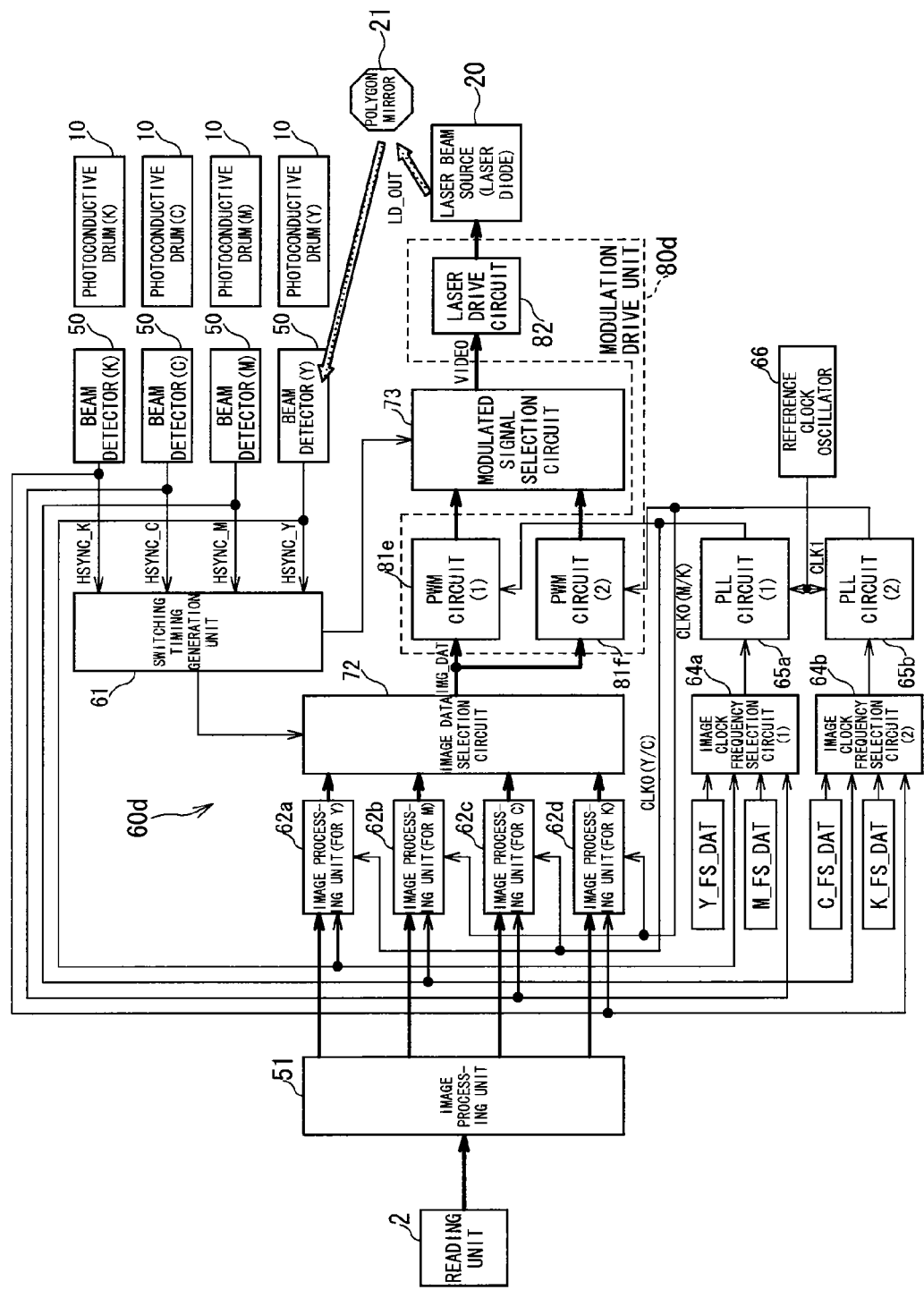
FIG. 15 is a block diagram mainly showing an exemplary detailed configuration of an image clock/data switching unit and that of a modulation drive unit in a fifth embodiment.

FIG. 15 is a block diagram showing an exemplary detailed configuration of an image clock/data switching unit 60*d* and that of a modulation drive unit 80*d*, and an exemplary configuration of peripheral equipment in a fifth embodiment.

Figure 16:
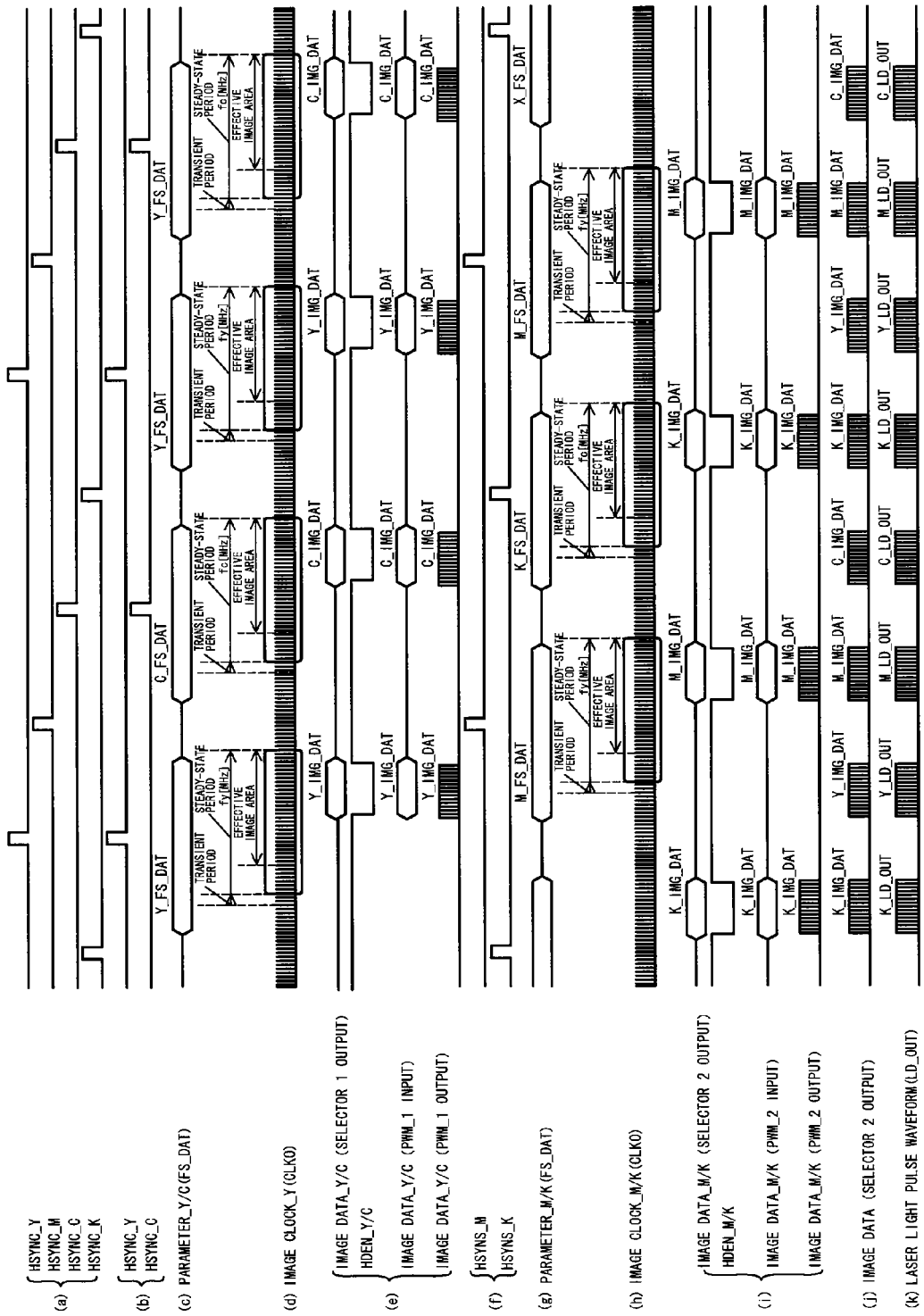
FIG. 16 is a timing diagram mainly showing a processing timing of the image clock/data switching unit and that of the modulation drive unit in the fifth embodiment.

FIG. 16 is a timing diagram related to a process of the image clock/data switching unit 60*d* and that of the modulation drive unit 80*d* in the fifth embodiment.

In the fifth embodiment, the configuration includes two PLL circuits of a PLL circuit (1) 65*a* that generates an image clock for use of Y (first color) and an image clock for use of C (third color), and a PLL circuit (2) 65*b* that generates an image clock for use of M (second color) and an image clock for use of K (fourth color).

To the PLL circuit (1) 65*a*, frequency data for use of Y (Y_FS_DAT) and frequency data for use of C (C_FS_DAT) are selected for setting by an image clock frequency selection circuit (1) 64*a*. To the PLL circuit (2) 65*b*, frequency data for use of M (M_FS_DAT) and frequency data for use of K (K_FS_DAT) are selected for setting by an image clock frequency selection circuit (2) 64*b*.

The PWM circuit is also configured by two of a PWM circuit (1) 81*e* that generates a pulse width modulation signal with respect to the Y-use image data and the C-use image data, and a PWM circuit (2) 81*f* that generates a pulse width modulation signal with respect to M-use image data and K-use image data.

Note here that the image processing unit is so configured as to include four image processing units (62*a*, 62*b*, 62*c*, and 62*d*) with respect to the colors of Y, M, C, and K.

As shown in FIG. 16(*e*), in the image data selection circuit 72, the outputs of the image processing unit (for use of Y) 62*a* and the image processing unit (for use of C) 62*c* are selected by the enable signals HDEN_Y and HDEN_C (HDEN_Y/C) respectively corresponding to the scanning periods for the colors of Y and C, and the selection results are output to the PWM circuit (1). As shown in FIG. 16(*i*), also in the image data selection circuit 72, the outputs of the image processing unit (for use of M) 62*c* and the image processing unit (for use of K) 62*d* are selected by the enable signals HDEN_M and HDEN_K (HDEN_M/K) respectively corresponding to the scanning periods for the colors of M and K, and the selection results are output to the PWM circuit (2).

On the other hand, the timing for image clock switching in the PLL circuit (1) 65*a* from a Y-use image clock to a C-use image clock is set to a range after a Y-color image is formed on the corresponding photoconductive drum 10 by a line but before the image data selection circuit 72 selects and outputs C-color image data to the PWM circuit (1). Also, the timing for image clock switching in the PLL circuit (1) 65*a* from a C-use image clock to a Y-use image clock is set to a range after a C-color image is formed on the corresponding photoconductive drum 10 by a line but before the image data selection circuit 72 selects and outputs Y-color image data to the PWM circuit (1) (refer to FIGS. 16(*c*) and (*d*)).

Similarly, the timing for image clock switching in the PLL circuit (2) 65*b* from an M-use image clock to a K-use image clock is set to a range after an M-color image is formed on the corresponding photoconductive drum 10 by a line but before the image data selection circuit 72 selects and outputs K-color image data to the PWM circuit (1). Also, the timing for image clock switching in the PLL circuit (2) 65*b* from a K-use image clock to an M-use image clock is set to a range after a K-color image is formed on the corresponding photoconductive drum 10 by a line but before the image data selection circuit 72 selects and outputs M-color image data to the PWM circuit (2) (refer to FIGS. 16(*g*) and (*h*)).

In the modulation signal selection circuit 73, the pulse width modulation signals respectively coming from the PWM circuit (1) and the PWM circuit (2) are sequentially selected in order of Y, M, C, and K, and the selection results are output to the laser drive circuit 82.

As such, with respect to the PLL circuit (1) and the PLL circuit (2) of the fifth embodiment, assuming that a switching cycle among the colors of Y, M, C, and K is T, the frequency data is set with a cycle 2T twice thereof. Therefore, after the setting of the frequency data, the transient time can be ensured to be long enough, thereby being able to use an image clock of any stabilized frequency. Accordingly, the switching cycle T can be reduced for each of the colors, and the image formation can be enhanced in speed.

Moreover, although the four clock generation units are separately provided in the third and fourth embodiments, the fifth embodiment is of the configuration including two clock generation units. Therefore, the hardware size can be reduced to a further degree compared with the third and fourth embodiments.

7. Sixth Embodiment

Figure 17:
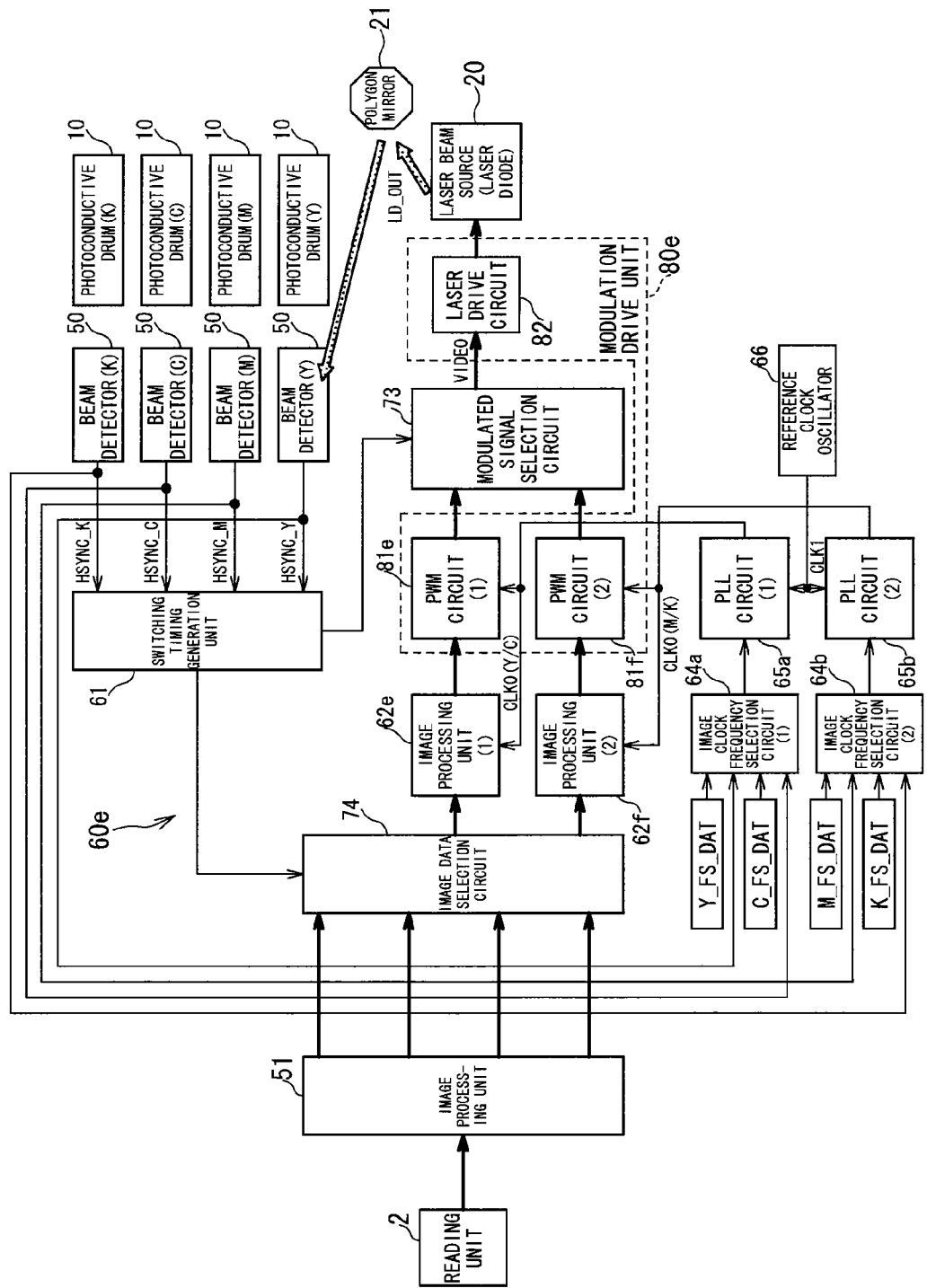
FIG. 17 is a block diagram mainly showing an exemplary detailed configuration of an image clock/data switching unit and that of a modulation drive unit in a sixth embodiment.

FIG. 17 is a block diagram showing an exemplary detailed configuration of an image clock/data switching unit 60*e* and that of a modulation drive unit 80*e*, and an exemplary configuration of peripheral equipment in a sixth embodiment.

Figure 18:
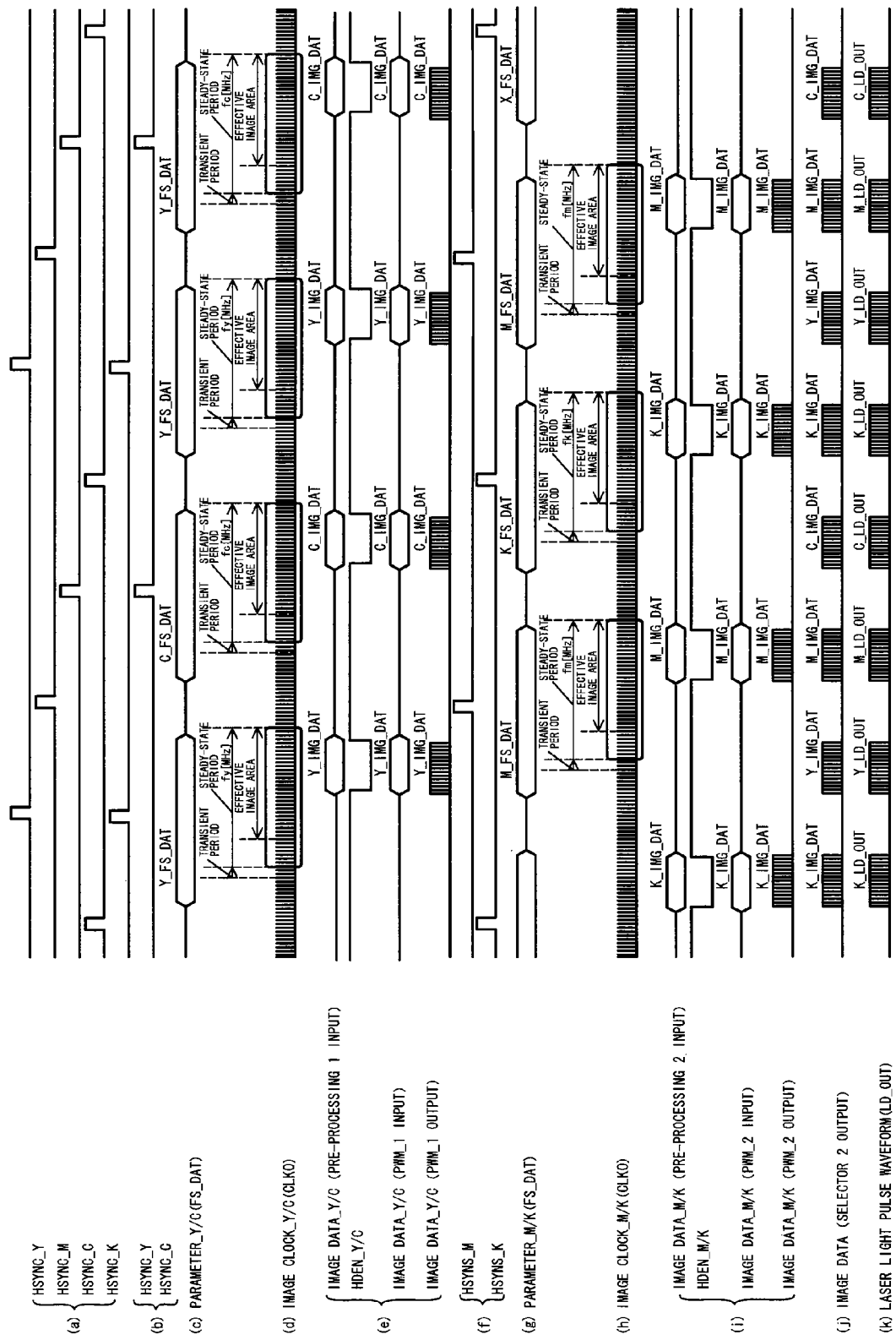
FIG. 18 is a timing diagram mainly showing a processing timing of the image clock/data switching unit and that of the modulation drive unit in the sixth embodiment.

FIG. 18 is a timing diagram related to a process of the image clock/data switching unit 60*e* and that of the modulation drive unit 80*e* in the sixth embodiment.

In the fifth embodiment, four image processing units (62*a*, 62*b*, 62*c*, and 62*d*) are respectively provided for the colors. On the other hand, in the sixth embodiment, two image processing units take charge of image processing of four colors. An image processing unit (1) 62*e* takes charge of image processing of the colors of Y and C, and an image processing unit (2) 62*f* takes charge of image processing of the colors of M and K.

As shown in FIG. 18(*e*), in the image data selection circuit 74, Y-color image data and C-color image data coming from the image processing unit 51 are selected by the enable signals HDEN_Y and HDEN_C (HDEN_Y/C) corresponding to the scanning period of the colors of Y and C, and the selection results are output to the image processing unit (1) 62*e*. As shown in FIG. 18(*i*), also in the image data selection circuit 74, M-color image data and K-color image data are selected by the enable signals HDEN_M and HDEN_K (HDEN_M/K) corresponding to the scanning period of the colors of M and K, and the selection results are output to the image processing unit (2) 62*f*.

In the image processing unit (1) 62*e* and the PWM circuit (1) 81*e*, performed is the process of establishing synchronization between a Y-use image clock and a C-use image clock alternately coming from the PLL circuit (1) at the cycle of 2T. The pulse width modulation signal coming from the PWM circuit (1) 81*e* is input to the modulation signal selection circuit 73. Similarly, in the image processing unit (2) 62*f* and the PWM circuit (2) 81*f*, performed is the process of establishing synchronization between an M-use image clock and a K-use image clock alternately coming from the PLL circuit (2) at the cycle of 2T. The pulse width modulation signal coming from the PWM circuit (2) 81f is input to the modulation signal selection circuit 73.

In the modulation signal selection circuit 73, the pulse width modulation signals respectively coming from the PWM circuit (1) and the PWM circuit (2) are selected sequentially in order of Y, M, C, and K, and the selection results are output to the laser drive circuit 82.

In the sixth embodiment, the effects similar to those in the fifth embodiment can be also achieved, and the number of the image processing units is reduced from four to two so that the hardware size can be reduced in its entirety.

As described above, according to the image forming apparatuses and the control methods thereof in the above embodiments, in the course of scanning a plurality of photoconductive drums respectively corresponding to various colors with a laser beam by a single piece of polygon mirror whose reflection surfaces are formed with various different inclination angles respectively corresponding to the colors, any variations of an image magnification possibly occurred in the main scanning direction depending on which color can be reduced, and any possible out of color registration or others can be eliminated.

Note here that the invention is not restrictive to the embodiments as described above, and for implementation, the components can be modified for implementation without departing from the scope of the invention. Moreover, it is understood that numerous other embodiments can be devised by appropriate combinations of a plurality of components disclosed in the embodiments described above. For example, some of the components may be omitted from those others exemplified in the embodiments. Moreover, the components in the embodiments may be appropriately combined.

What is claimed is:

1. An image forming apparatus, comprising:
    a laser beam source;
    a plurality of photoconductive members respectively corresponding to a plurality of colors;
    a modulation drive unit configured to subject image data of each of the colors to pulse width modulation by an image clock having a cycle of a pixel length of the image data, and drive the laser beam source;
    a single piece of polygon mirror whose reflection surfaces are disposed in a rotation direction thereof with a plurality of different inclination angles respectively corresponding to the plurality of colors, and via a plurality of different optical paths respectively corresponding to the inclination angles, the polygon mirror scanning the photoconductive members with a light coming from the laser beam source sequentially for each of the colors in a main scanning direction;
    a plurality of beam detectors respectively corresponding to the plurality of photoconductive members, each disposed adjacent to and on an upstream side of the corresponding photoconductive member in the main scanning direction; and
    an image clock/data switching unit configured to generate the image clock of a frequency varying with the colors for making the same a color-based image magnification defined by an optical path length of each of the optical paths of the colors, and switch at least either the image clocks generated for each of the colors or the image data of each of the colors in synchronization with a detection signal coming from the beam detector, the image clock/data switching unit further configured to, when first, second, third, and fourth colors are switched in a sequential manner:
        set, at a cycle of twice a switching cycle of each of the colors, first frequency data corresponding to the first color and third frequency data corresponding to the third color, and generate an image clock for the first color and an image clock for the third color using a phase-locked loop based on the first and third frequency data; and
        set, at a cycle of twice the switching cycle of each of the colors, second frequency data corresponding to the second color and fourth frequency data corresponding to the fourth color, and generate an image clock for the second color and an image clock for the fourth color using the phase-locked loop based on the second and fourth frequency data.

2. The image forming apparatus according to claim 1, wherein
    the image clock/data switching unit includes:
    a first clock generation unit that, when the first, second, third, and fourth colors are switched in a sequential manner, sets, at a cycle of twice a switching cycle of each of the colors, first frequency data corresponding to the first color and third frequency data corresponding to the third color, and using a phase-locked loop, generates an image clock for the first color and an image clock for the third color; and
    a second clock generation unit that, when the first, second, third, and fourth colors are switched in a sequential manner, sets, at a cycle of twice the switching cycle of each of the colors, second frequency data corresponding to the second color and fourth frequency data corresponding to the fourth color, and using the phase-locked loop, generates an image clock for the second color and an image clock for the fourth color.

3. The image forming apparatus according to claim 1, further comprising
    four image processing units for each of the colors for subjecting the image data of each of the colors to image processing using the image clocks generated respectively by the first and second clock generation units for each of the colors,
    wherein, the image clock/data switching unit switches, in synchronization with the detection signals, for output to the modulation drive unit, the image data of each of the colors coming from each of the image processing units after the image processing.

4. The image forming apparatus according to claim 1, further comprising
    a first image processing unit that subjects the image data of each of the colors to image processing using the first and third image clocks generated by the first clock generation unit, and
    a second image processing unit that subjects the image data of each of the colors to the image processing using the second and fourth image clocks generated by the second clock generation unit,
    wherein, the image clock/data switching unit switches the image data of each of the colors in synchronization with the detection signals, outputs the image data for the first and third colors to the first image processing unit, and outputs the image data for the second and fourth colors to the second image processing unit.

5. A control method of an image forming apparatus, comprising:
    driving a laser beam source by a signal being a result of pulse width modulation based on color-based image data and a color-based image clock;

sequentially scanning, by a single piece of polygon mirror whose reflection surfaces are disposed in a rotation direction thereof with a plurality of different inclination angles respectively corresponding to a plurality of colors, for each of the colors, a plurality of photoconductive members provided to each of the colors in a main scanning direction with a light coming from the laser beam source via a plurality of different optical paths respectively corresponding to the inclination angles;

for each of the plurality of colors, detecting a scanning timing in the main scanning direction by each of a plurality of beam detectors corresponding to the plurality of photoconductive members that are disposed adjacent to and an upstream side of the corresponding photoconductive member in the main scanning direction; and generating the image clock of a frequency varying with the colors for making the same a color-based image magnification defined by an optical path length of each of the optical paths of the colors, and switching at least either the image clocks generated for each of the colors or the color-based image data in synchronization with a detection signal coming from the beam detector, the generating the image clock step including, when first, second, third, and fourth colors are switched in a sequential manner:

setting, at a cycle of twice a switching cycle of each of the colors, first frequency data corresponding to the first color and third frequency data corresponding to the third color, and generating an image clock for the first color and an image clock for the third color using a phase-locked loop based on the first and third frequency data, and setting, at a cycle of twice the switching cycle of each of the colors, second frequency data corresponding to the second color and fourth frequency data corresponding to the fourth color, and generating an image clock for the second color and an image clock for the fourth color using the phase-locked loop based on the second and fourth frequency data.

6. The control method according to claim 5, wherein
in the generating the image clock step, when the first, second, third, and fourth colors are switched in a sequential manner, first frequency data corresponding to the first color and third frequency data corresponding to the third color are set at a cycle of twice a switching cycle of each of the colors, and by a first clock generation unit using a phase-locked loop, an image clock for the first color and an image clock for the third color are generated, and second frequency data corresponding to the second color and fourth frequency data corresponding to the fourth color are set at a cycle of twice the switching cycle of each of the colors, and by a second clock generation unit using the phase-locked loop, an image clock for the second color and an image clock for the fourth color are generated.

7. The control method according to claim 5, further comprising
subjecting, by four image processing units provided for each of the colors, the color-based image data to image processing using the image clocks generated respectively by the first and second clock generation units for each of the colors, wherein
in the generating the image clock step, in synchronization with the detection signals, the color-based image data coming from each of the image processing units is switched after the image processing.

8. The control method according to claim 5, further comprising
subjecting, by a first image processing unit, the image data of the first and third colors to image processing respectively using the first and third image clocks generated by the first clock generation unit, and subjecting, by a second image processing unit, the image data of the second and fourth colors to the image processing respectively using the second and fourth image clocks generated by the second clock generation unit, wherein
in the generating the image clock step, the color-based image data is switched in synchronization with the detection signals, the image data for the first and third colors is output to the first image processing unit, and the image data for the second and fourth colors is output to the second image processing unit.

* * * * *